(12) United States Patent
Yum et al.

(10) Patent No.: US 10,574,324 B2
(45) Date of Patent: Feb. 25, 2020

(54) METHOD FOR REPORTING CHANNEL STATE IN WIRELESS COMMUNICATION SYSTEM, AND DEVICE THEREFOR

(71) Applicant: LG ELECTRONICS INC., Seoul (KR)

(72) Inventors: Kunil Yum, Seoul (KR); Jiwon Kang, Seoul (KR); Kijun Kim, Seoul (KR); Hyungtae Kim, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/266,890

(22) Filed: Feb. 4, 2019

(65) Prior Publication Data

US 2019/0245603 A1 Aug. 8, 2019

Related U.S. Application Data

(63) Continuation of application No. PCT/KR2017/008429, filed on Aug. 4, 2017.

(60) Provisional application No. 62/371,223, filed on Aug. 5, 2016, provisional application No. 62/373,976, filed on Aug. 11, 2016, provisional application No. 62/400,055, filed on Sep. 26, 2016, provisional
(Continued)

(51) Int. Cl.
| | | |
|---|---|---|
| *H04L 12/28* | (2006.01) | |
| *H04B 7/06* | (2006.01) | |
| *H04B 17/24* | (2015.01) | |
| *H04L 5/00* | (2006.01) | |
| *H04W 72/04* | (2009.01) | |
| *H04J 1/16* | (2006.01) | |

(52) U.S. Cl.
CPC ............ *H04B 7/0626* (2013.01); *H04B 7/06* (2013.01); *H04B 7/0617* (2013.01); *H04B 7/0695* (2013.01); *H04B 17/24* (2015.01); *H04L 5/005* (2013.01); *H04W 72/042* (2013.01); *H04W 72/0446* (2013.01); *H04L 5/0007* (2013.01)

(58) Field of Classification Search
CPC .. H04B 7/0617; H04B 7/0626; H04B 7/0695; H04B 17/24; H04L 5/0007
USPC ........................................ 370/252, 329, 386
See application file for complete search history.

(56) References Cited

U.S. PATENT DOCUMENTS

| | | |
|---|---|---|
| 2015/0063177 A1 | 3/2015 | Kim et al. |
| 2015/0063488 A1 | 3/2015 | Dinan |

(Continued)

FOREIGN PATENT DOCUMENTS

WO   2013165149 A1   11/2013

OTHER PUBLICATIONS

International Search Report from PCT/KR2017/008429, dated Nov. 6, 2017.

(Continued)

*Primary Examiner* — John Pezzlo
(74) *Attorney, Agent, or Firm* — Dentons US LLP

(57) ABSTRACT

A channel state reporting method based on a channel state information-reference signal (CSI-RS) in a wireless communication system, according to one embodiment of the present invention, comprises the steps of: receiving a CSI-RS-related configuration from a base station; calculating a CSI by measuring a CSI-RS according to the CSI-RS-related configuration; and transmitting the calculated CSI to the base station, wherein the CSI-RS-related configuration may include a CSI-RS configuration for a CSI or a CSI-RS configuration for beam management (BM).

16 Claims, 25 Drawing Sheets

Related U.S. Application Data application No. 62/404,743, filed on Oct. 5, 2016, provisional application No. 62/417,255, filed on Nov. 3, 2016, provisional application No. 62/442,936, filed on Jan. 5, 2017.

(56) References Cited

U.S. PATENT DOCUMENTS

| | | | |
|---|---|---|---|
| 2016/0142189 A1* | 5/2016 | Shin | H04B 7/0626 370/329 |
| 2017/0033912 A1* | 2/2017 | Onggosanusi | H04B 7/0626 |
| 2019/0123801 A1* | 4/2019 | Yum | H04B 7/0626 |
| 2019/0132851 A1* | 5/2019 | Davydov | H04L 5/0053 |

OTHER PUBLICATIONS

Written Opinion of the ISA from PCT/KR2017/008429, dated Nov. 6, 2017.

Intel, Ericsson, Nokia, Qualcomm, Samsung, ZTE, NTT DoCoMo, Huawei, Xinwei, CATT, MTK, "WF on beam management", 3GPP TSG RAN1 #85, May 23-27, 2016, R1-166030.

Nokia, Alcatel-Lucent Shanghai Bell, Beam management in NR, 3GPP TSG-RAN WG2 Meeting #94, May 23-27, 2016, R2-163476.

* cited by examiner

FIG. 9
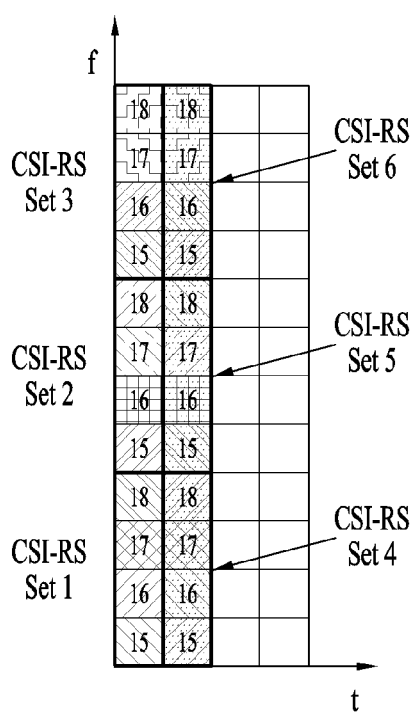
(a) 12-RE Resource Candidate
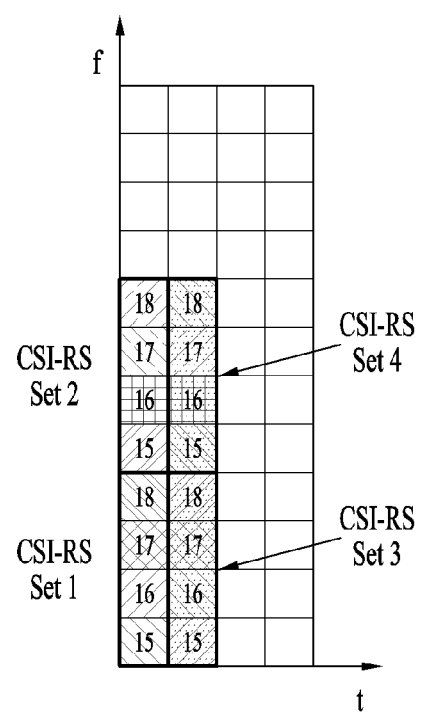
(b) 8-RE Resource Candidate (a)  (b)

▨ CSI-RS Ports 0 and 1 in CDM

Offset 0    Offset 1

▦ : Port 1    ▨ : Port 2

FIG. 17
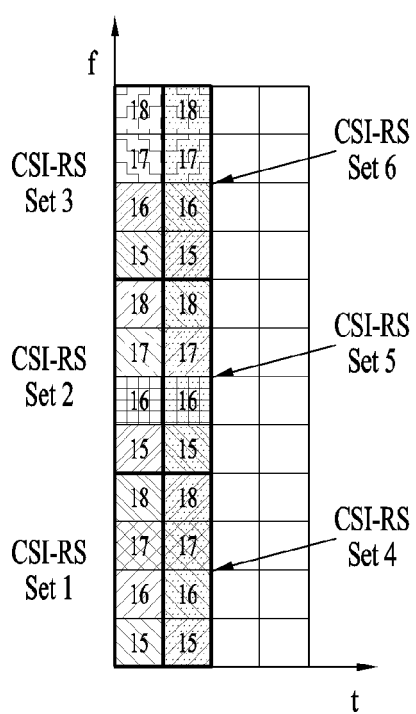
(a) 4-TXU Constraint
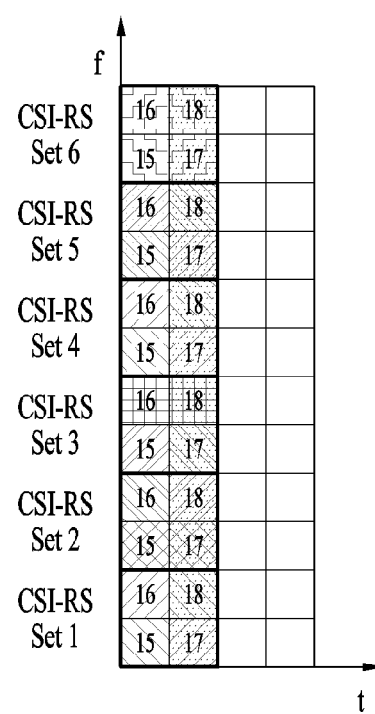
(b) 2-TXU Constraint

FIG. 18
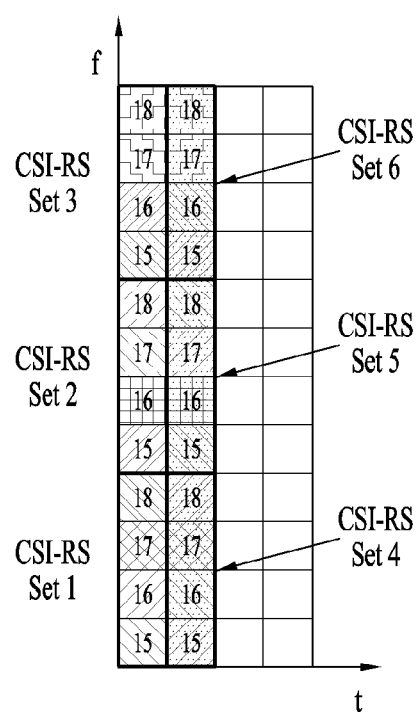
(a) 3-Bit CSI-RS Indication
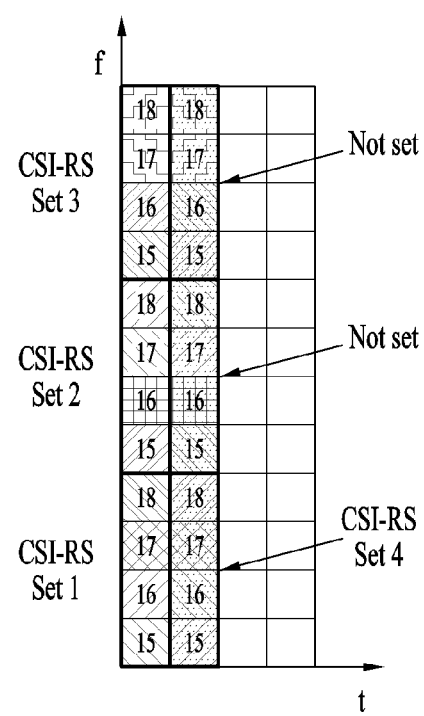
(b) 2-Bit CSI-RS Indication

METHOD FOR REPORTING CHANNEL STATE IN WIRELESS COMMUNICATION SYSTEM, AND DEVICE THEREFOR

CROSS-REFERENCE TO RELATED APPLICATIONS

This application is a continuation of International Application No. PCT/KR2017/008429, filed on Aug. 4, 2017, which claims the benefit of U.S. Provisional Application No. 62/371,223, filed on Aug. 5, 2016, 62/373,976, filed on Aug. 11, 2016, 62/400,055, filed on Sep. 26, 2016, 62/404,743, filed on Oct. 5, 2016, 62/417,255, filed on Nov. 3, 2016 and 62/442,936, filed on Jan. 5, 2017, which are all hereby incorporated by reference herein in their entirety.

TECHNICAL FIELD

The present disclosure relates to a wireless communication system, and more particularly, to a method and apparatus for reporting a channel state.

BACKGROUND ART

As more and more communication devices require larger communication capacities, there is a need for more enhanced mobile broadband communication (eMBB) than legacy radio access technologies (RATs). In addition, massive machine type communications (mMTC) which connects multiple devices and objects to one another to provide various services at any time in any place is one of main issues to be considered for future-generation communications. Besides, a communication system design which considers services sensitive to reliability and latency is under discussion. As such, the introduction of a future-generation RAT in consideration of eMBB, mMTC, ultra-reliable and low-latency communication (URLLC), and so on is under discussion. In the present disclosure, this technology is referred to as New RAT, for the convenience's sake.

DISCLOSURE

Technical Problem

The present disclosure is intended to propose a method of reporting a channel state. More particularly, the present disclosure is intended to propose a method of reporting a channel state based on an aperiodic channel state information-reference signal (CSI-RS).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of reporting a channel state based on a channel state information-reference signal (CSI-RS) in a wireless communication system includes receiving a CSI-RS-related configuration from a base station, calculating channel state information (CSI) by measuring a CSI-RS according to the CSI-RS-related configuration, and transmitting the calculated CSI to the base station. The CSI-RS-related configuration may include a CSI-RS configuration for CSI or a CSI-RS configuration for beam management (BM).

Additionally or alternatively, the CSI-RS-related configuration may include information about time resources related to a CSI-RS for BM, distinguished from resources related to a CSI-RS for CSI on a time axis.

Additionally or alternatively, the information about the time resources related to the CSI-RS for BM may configure a different starting position from a starting position of the resources related to the CSI-RS for CSI.

Additionally or alternatively, the CSI-RS-related configuration may include information about a maximum number of antenna ports for a CSI-RS for BM.

Additionally or alternatively, the CSI-RS-related configuration may include information about a maximum density of a CSI-RS for BM.

Additionally or alternatively, the CSI-RS-related configuration may indicate one of the CSI-RS configuration for CSI and the CSI-RS configuration for BM, and the received CSI-RS-related configuration may be interpreted according to the indicated CSI-RS configuration.

According to another embodiment of the present disclosure, a UE for reporting a channel state based on a CSI-RS in a wireless communication system includes a transmitter and a receiver, and a processor configured to control the transmitter and the receiver. The processor is configured to receive a CSI-RS-related configuration from a base station, to calculate CSI by measuring a CSI-RS according to the CSI-RS-related configuration, and to transmit the calculated CSI to the base station. The CSI-RS-related configuration may include a CSI-RS configuration for CSI or a CSI-RS configuration for BM.

Additionally or alternatively, the CSI-RS-related configuration may include information about time resources related to a CSI-RS for BM, distinguished from resources related to a CSI-RS for CSI on a time axis.

Additionally or alternatively, the information about the time resources related to the CSI-RS for BM may configure a different starting position from a starting position of the resources related to the CSI-RS for CSI.

Additionally or alternatively, the CSI-RS-related configuration may include information about a maximum number of antenna ports for a CSI-RS for BM.

Additionally or alternatively, the CSI-RS-related configuration may include information about a maximum density of a CSI-RS for BM.

Additionally or alternatively, the CSI-RS-related configuration may indicate one of the CSI-RS configuration for CSI and the CSI-RS configuration for BM, and the received CSI-RS-related configuration may be interpreted according to the indicated CSI-RS configuration.

The foregoing solutions are merely a part of the embodiments of the present disclosure, and those skilled in the art could derive and understand various embodiments reflecting the technical features of the present disclosure from the following detailed description of the present disclosure.

Advantageous Effects

According to the embodiments of the present disclosure, channel state measurement may be efficiently processed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 9 illustrates a configuration of 4-port CSI-RS resource sets satisfying frequency resource constraints;

FIG. 17 illustrates a configuration of CSI-RS resource sets satisfying constraints on the number of transmission units (TXUs) of an evolved Node B (eNB);

FIG. 18 illustrates a configuration of CSI-RS resource sets satisfying constraints on the size of a CSI-RS indication field of downlink control information (DCI);

BEST MODE FOR CARRYING OUT THE INVENTION

Figure 1:
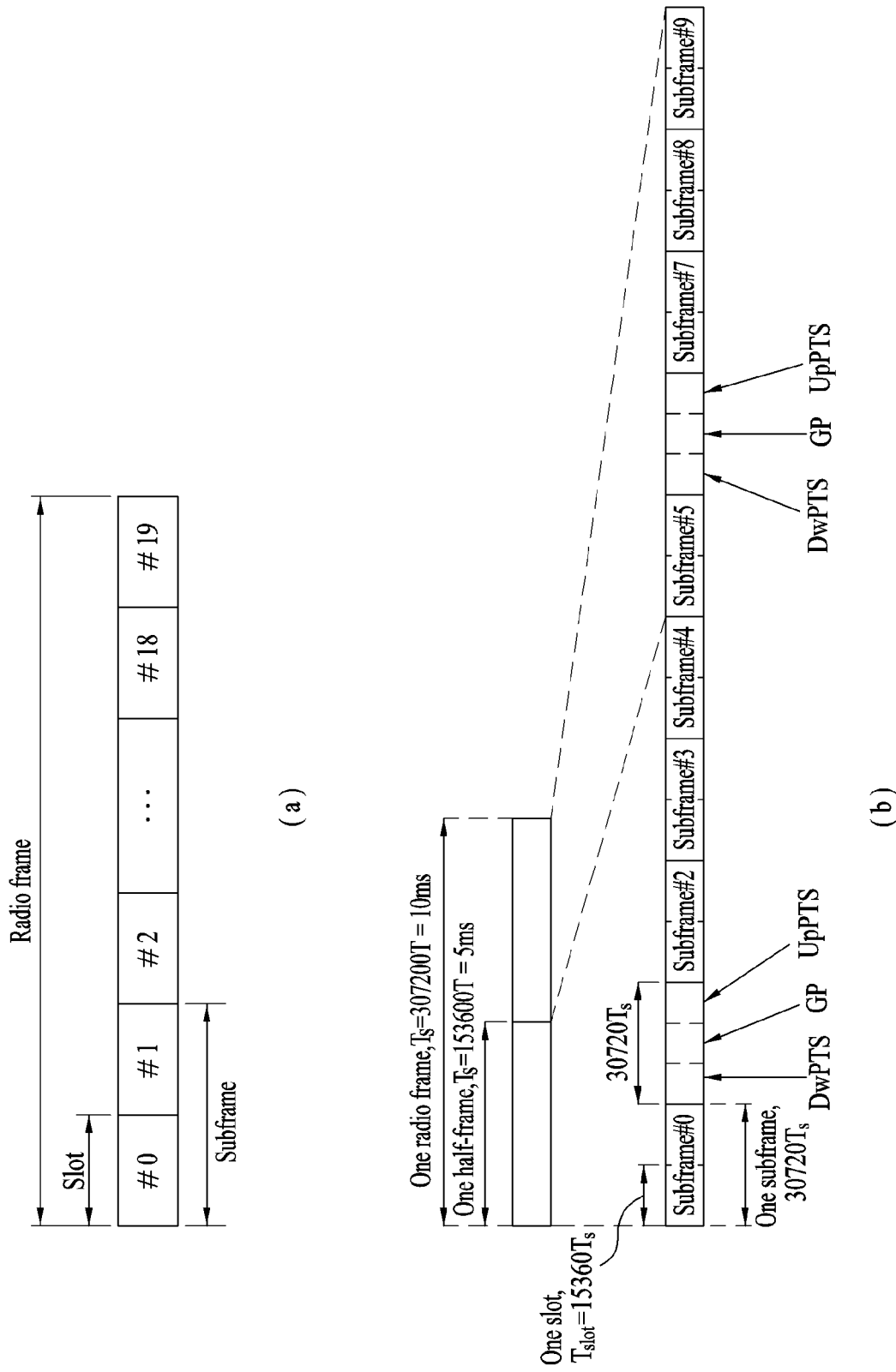
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Dowlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
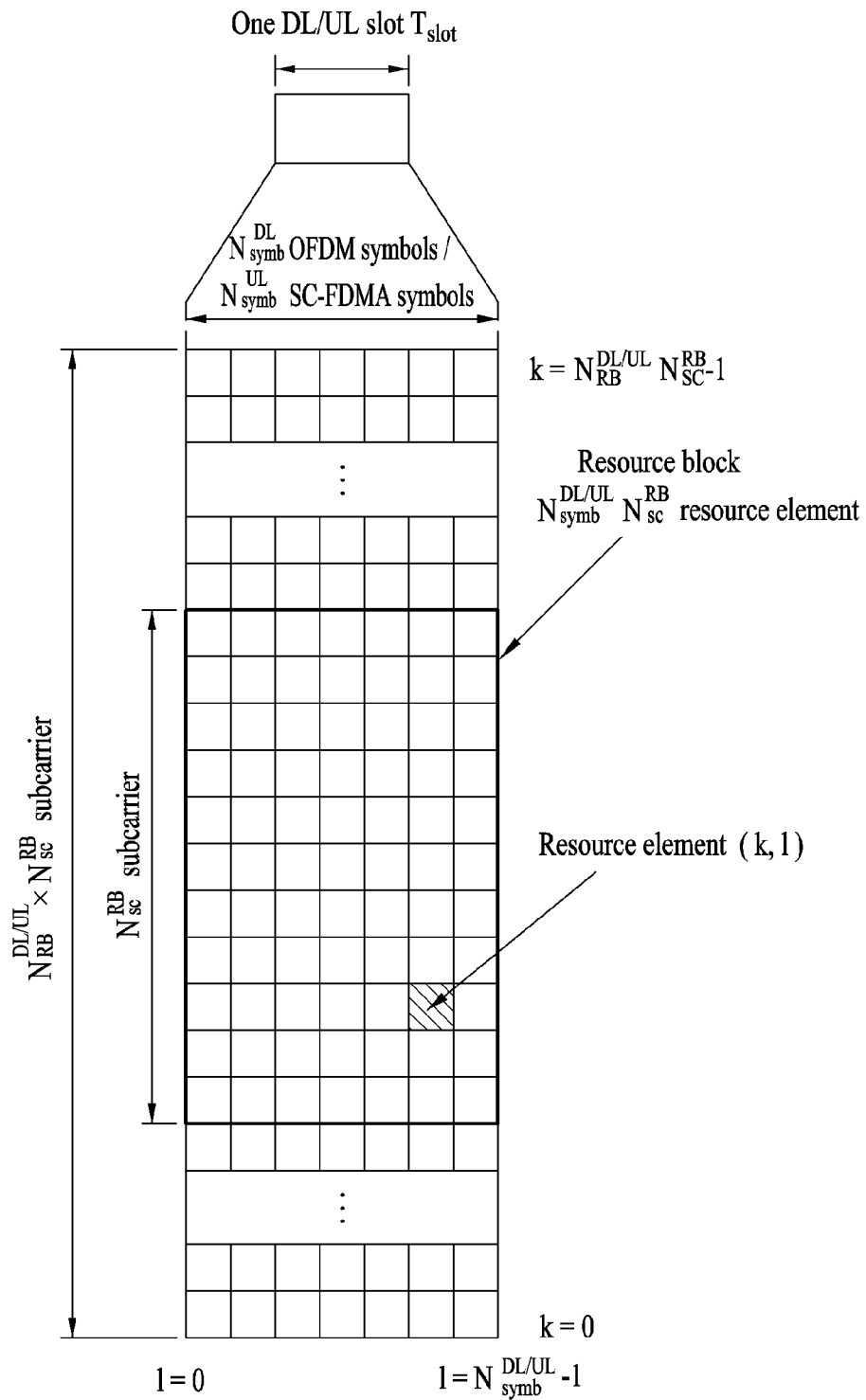
FIG. 2 illustrates an exemplary downlink/uplink (DL/UL) slot structure in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $B_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
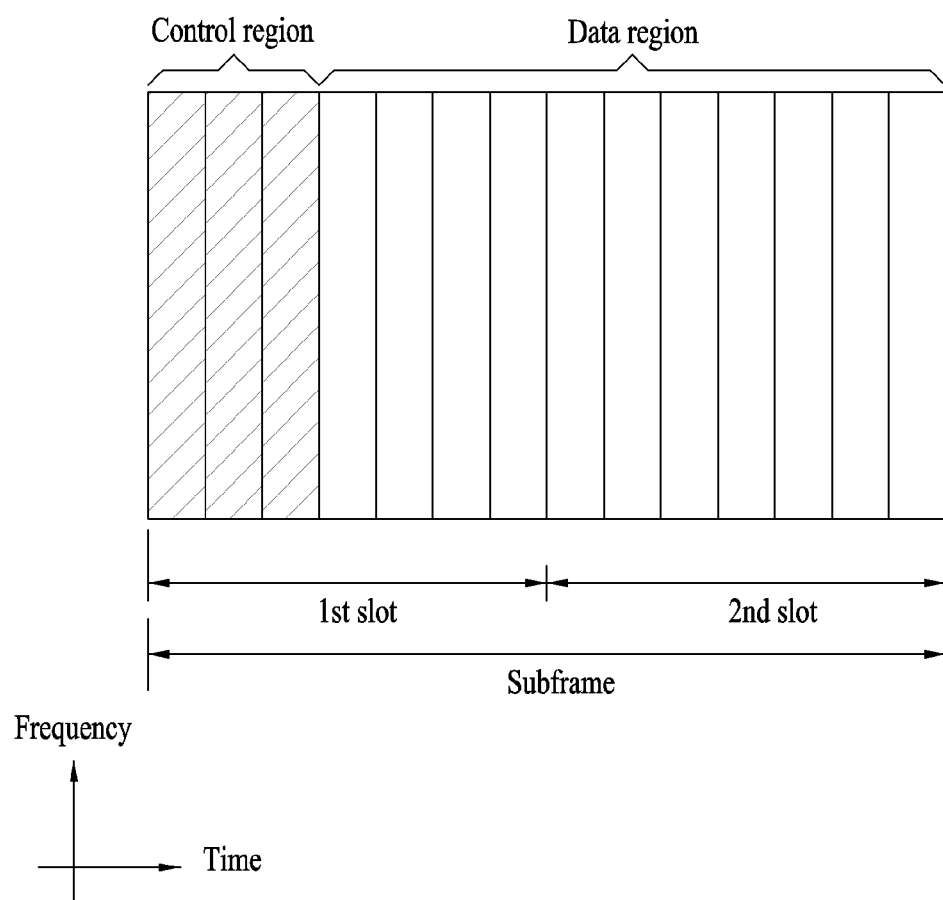
FIG. 3 illustrates an exemplary DL subframe structure in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
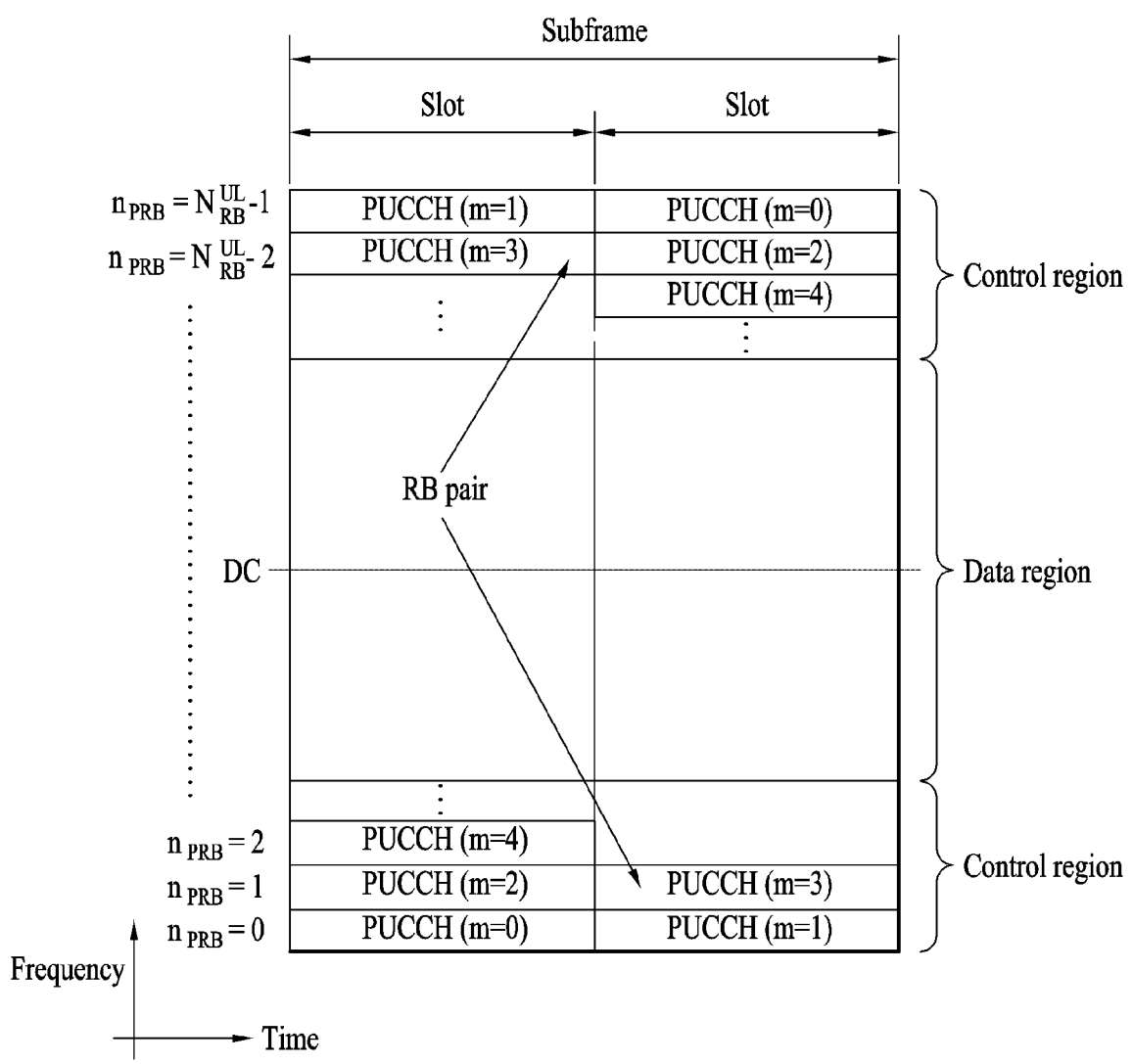
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, |

TABLE 6-continued

| | PMI Feedback Type | | |
|---|---|---|---|
| | No PMI | Single PMI | Multiple PMIs |
| UE selected (Subband CQI) | Mode 2-0 RI (only for Open-loop SM) 1st wideband CQI(4 bit) + Best-M CQI(2 bit) (Best-M CQI: An average CQI for M SBs selected from among N SBs) Best-M index (L bit) | | N*subband W2 + wideband W1) Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) |
| Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
  ii) Type 1a: the UE transmits an SB CQI and a second PMI.
  iii) Types 2, 2b and 2c: the UE transmits a WB-CQI/PMI.
  iv) Type 2a: the UE transmits a WB PMI.
  v) Type 3: the UE transmits an RI.
  vi) Type 4: the UE transmits a WB CQI.
  vii) Type 5: the UE transmits an RI and a WB PMI.
  viii) Type 6: the UE transmits an RI and a PTI.
  ix) Type 7: the UE transmits a CRI (CSI-RS resource indicator) and an RI.
  x) Type 8: the UE transmits a CRI, an RI and a WB PMI.
  xi) Type 9: the UE transmits a CRI, an RI and a PTI (precoding type indication).
  xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
|---|---|
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
|---|---|
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

Figure 5:
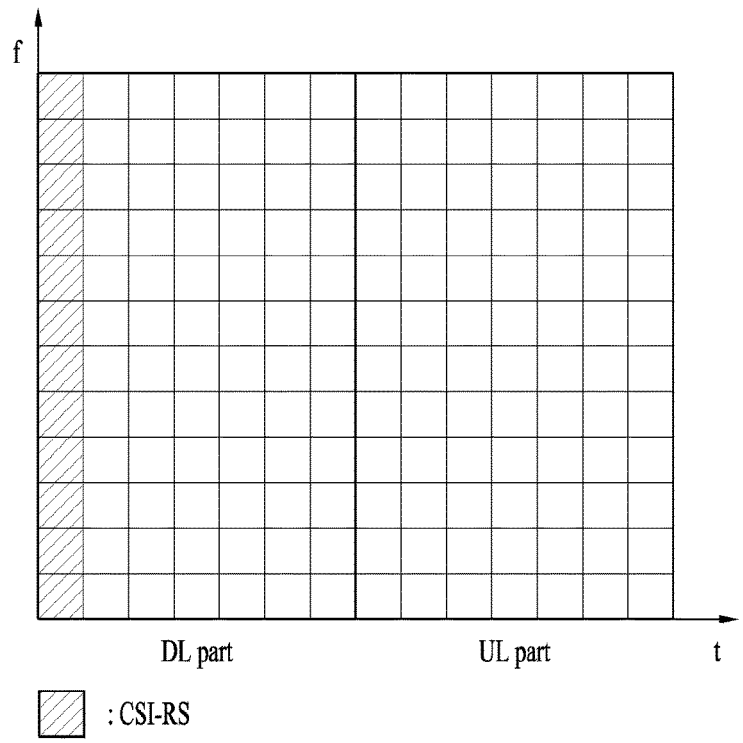
FIG. 5 illustrates a self-contained structure.

For a New RAT frame structure, a self-contained structure is under consideration. The self-contained structure is defined by combining DL and UL in structure, as illustrated in FIG. 5.

Figure 6:
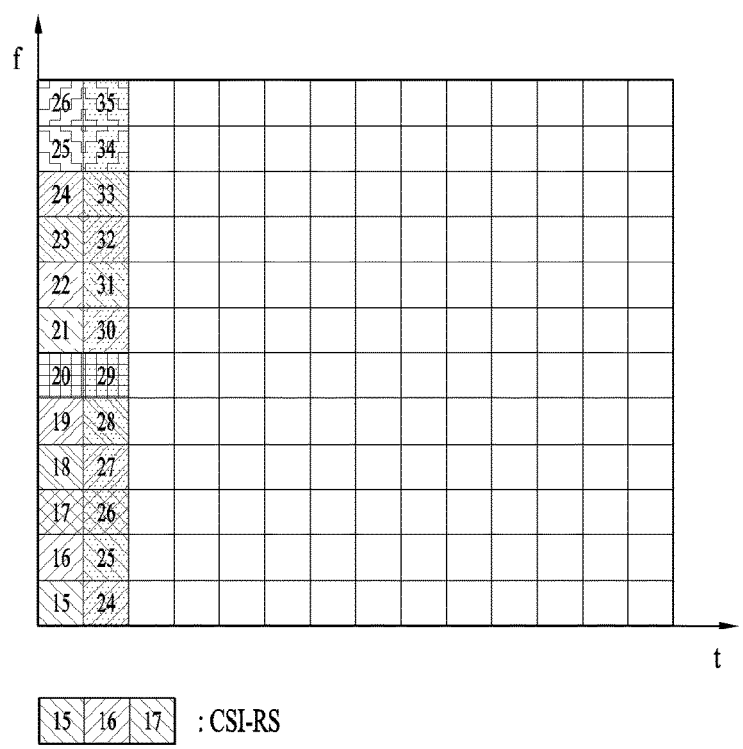
FIG. 6 illustrates a channel state information-reference signal (CSI-RS) transmitted in a plurality of symbols.

A method of transmitting a CSI-RS for channel measurement as illustrated in FIG. 6 may be considered, in which CSI-RS resource candidates are defined in one or more symbols, and a CSI-RS to be measured by a UE is indicated by a bitmap through signaling such as DCI or the like.

More specifically, this method amounts to an operation of aperiodically transmitting a CSI-RS to be measured by a UE in an aperiodic CSI-RS (A-CSI-RS) and indicating a transmission (time and/or frequency) resource for the CSI-RS by L1 signaling such as an A-CSI-RS indication of DCI by an eNB. The UE measures the CSI-RS and reports the measurement to the eNB, and this operation is requested to the UE by an aperiodic CSI request included in the DCI.

Figure 7:
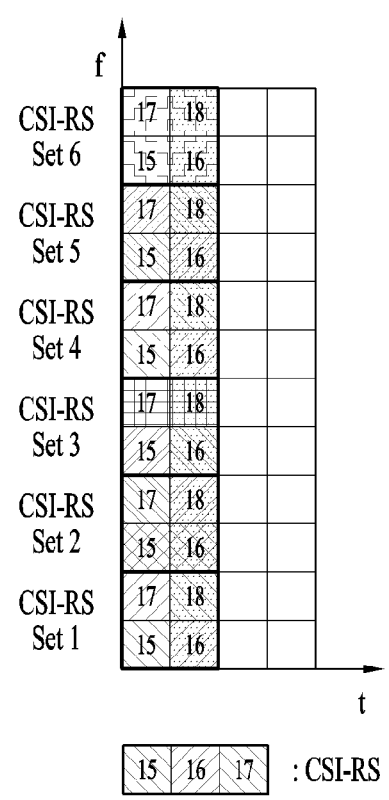
FIG. 7 illustrates a configuration of 4-port CSI-RS resource sets.

Despite the advantage of flexible indication of a CSI-RS resource to be used by a UE, the above method suffers from very large DCI overhead involved in indicating a corresponding CSI-RS resource (e.g., a 24-bit bitmap is required in the illustrated case of FIG. 6). The overhead linearly increases with an increase in the number of CSI-RS resource candidates, and the number of CSI-RS resource candidates in turn increases with an increase in the number of antenna ports at the eNB. Particularly in a New RAT environment in which a very large number of (e.g., 1024) antenna ports are considered at 6 GHz, the use of the above method results in too much DCI overhead. To reduce the DCI overhead, a plurality of CSI-RS sets may be predefined within CSI-RS resource candidates, and the index of a CSI-RS resource set may be indicated by DCI. Hereinbelow, a CSI-RS resource set refers to a set of RE positions at which a CSI-RS will be transmitted. FIG. 7 illustrates a configuration of 4-port CSI-RS resource sets.

For example, if CSI-RS resource set 1 is configured by a CSI-RS indication, the eNB transmits a CSI-RS in the lowest four REs allocated for the CSI-RS, and the UE measures the REs at the corresponding positions and calculates/reports CSI. While the following examples will be described in the context of a 4-port CSI-RS for the convenience of description, the same principle is also applicable to a configuration of CSI-RS resource sets for an eNB having a different number of ports, particularly, more than 4 antenna ports.

Hereinbelow, an antenna port refers to a virtual antenna element that may be assumed to have the same channel property (e.g., delay profile, Doppler spread, etc.) (at least in the same RB). A subframe (SF) refers to a transmission unit repeated with a predetermined time length, and may be defined differently for each numerology.

The above CSI-RS resource sets may be defined in a non-overlapping manner in consideration of the following factors.

Option 1. Time Resource Indication

A. Maximum Number of CSI-RS Symbols

Figure 8:
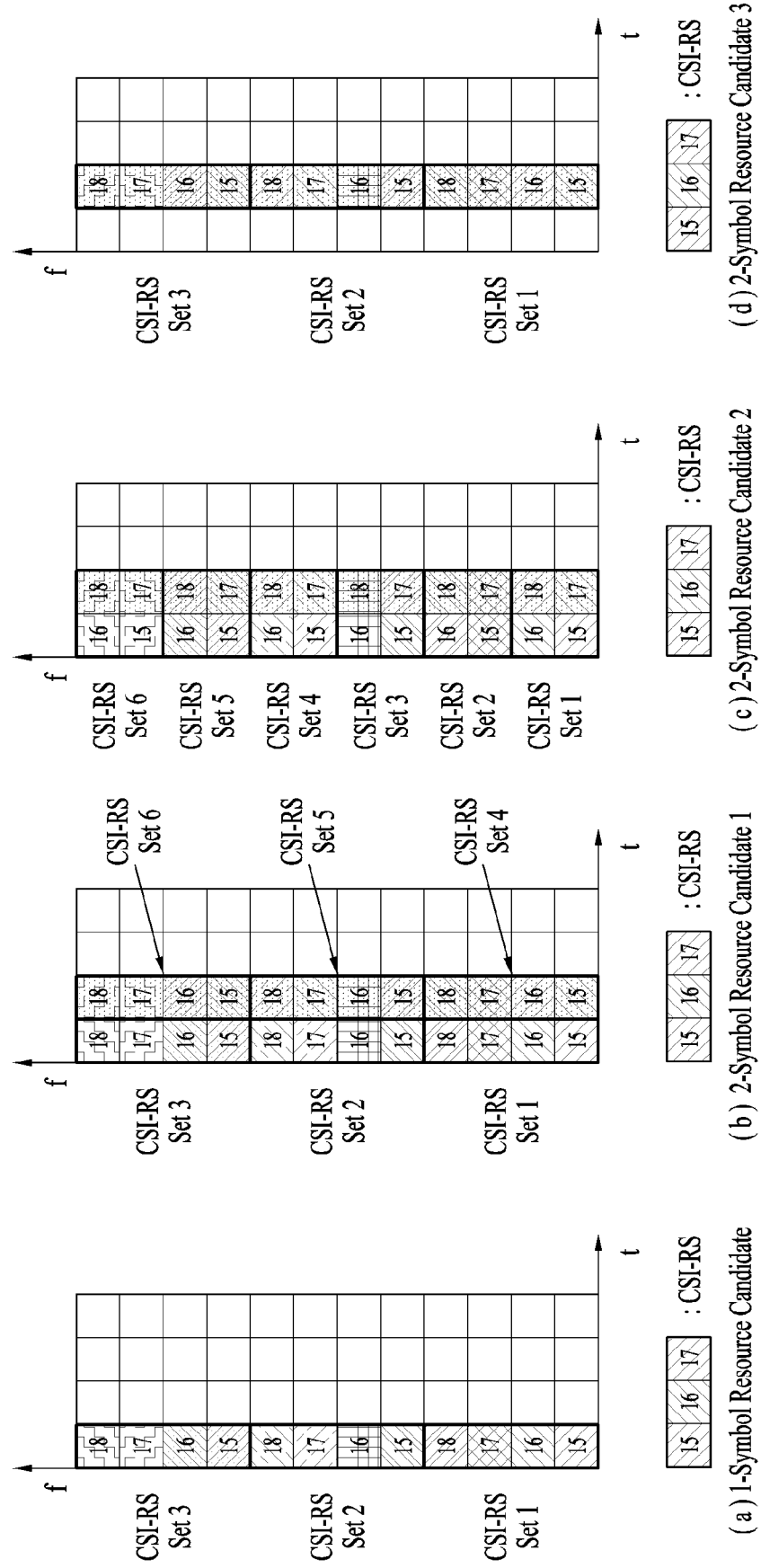
FIG. 8 illustrates a configuration of 4-port CSI-RS resource sets satisfying time resource constraints.

CSI-RS resource sets may be defined differently according to the number of symbols configured for CSI-RS resource candidates on the time axis. In the example of FIG. 8, when CSI-RS resource candidates are defined to occupy one symbol, such a configuration as in illustrated in (a) of FIG. 8 may be given, and when CSI-RS resource candidates are defined to occupy two symbols, configurations corresponding to one or both of (b) and (c) of FIG. 8 may be given.

B. CSI-RS Symbol to be Used

Further, the position of a symbol in which CSI-RS resource sets are defined may be defined/signaled for/to the UE. For example, as illustrated in (d) of FIG. 8, it may be configured that CSI-RS resource sets are defined only in a second symbol. The configuration is intended to ensure orthogonality by allocating different CSI-RS time resources to different UEs. This signaling is configured in the form of an offset from the first symbol of CSI-RS resource candidates, thereby minimizing signaling overhead.

C. When the time positions and range of CSI-RS resource candidates are predefined or configured separately by signaling, 'the maximum number of CSI-RS symbols' and/or 'a CSI-RS symbol to be used' may indicate a time position and/or range in which a CSI-RS resource set is to be defined, in the CSI-RS resource candidates.

Option 2. Frequency Resource Indication

A. Maximum Number of REs Per RB

CSI-RS resource sets may be defined differently according to the number of REs configured for CSI-RS resource candidates on the frequency axis. In the example of FIG. 9, when CSI-RS resource candidates are defined to occupy 12 REs per symbol per RB, CSI-RS resource sets should be defined as illustrated in (a) of FIG. 9, and when CSI-RS resource candidates are defined to occupy 8 REs per symbol per RB, CSI-RS resource sets should be defined as illustrated in (b) of FIG. 9, B. CSI-RS REs to be Used Further, if CSI-RS resource candidates occupy fewer REs than the maximum number of REs per symbol per RB, the positions of REs in the CSI-RS resource candidates, to be used for configuring CSI-RS resource sets should be indicated to the UE. This is intended to ensure orthogonality by allocating different CSI-RS frequency resources to different UEs. This signaling is configured in the form of an offset from the first RE of the CSI-RS resource candidates, thereby minimizing signaling overhead.

C. When the frequency positions and range of the CSI-RS resource candidates are predefined or configured separately by signaling, 'the maximum number of REs Per RB' and/or 'CSI-RS REs to be used' may indicate a frequency position and/or range in which a CSI-RS resource set is to be defined, in the CSI-RS resource candidates.

D. If a CSI-RS is defined in units of a plurality of RBs, not in units of one RB (e.g., if a CSI-RS resource set is defined across 2RBs), the eNB may indicate the number of CSI-RS RBs in which the CSI-RS is defined to the UE. 'CSI-RS REs to be used' and 'the maximum number of REs per symbol per RB' in item B should also be defined in units of a corresponding number of RBs (e.g., the maximum number of REs per 2 RBs, and CSI-RS REs to be used in 2 RBs should be defined). Hereinbelow, although the titles of the foregoing items are still used as they are, for the convenience, when item D is applied, the definitions should be changed accordingly.

An RS for interference measurement (i.e., channel state information-interference measurement (CSI-IM)) may be defined in a similar structure to that of the foregoing CSI-RS. That is, wideband CSI-IM/partial band CSI-IM/subband CSI-IM may be defined as granularities for the CSI-IM, and included in the following stages. Particularly, a plurality of CSI-IMs may be included along with one RS in each stage, so that CSI for multiple interference assumptions is reported. Regarding a target band for interference measurement for CSI, similarly to the CSI-RS, the eNB may indicate to the UE a target band for the partial band CSI-IM, semi-statically by high-layer signaling such as RRC signaling, and a target band for the subband CSI-IM, dynamically by L1 signaling such as DCI.

In this case, the CSI-IM may have a different frequency granularity from that of the CSI-RS. That is, the wideband/partial band/subband configuration of the CSI-IM may be configured differently from that of the CSI-RS. Herein, when CSI measurement is configured for the UE, a combination of a CSI-RS and a CSI-IM having different frequency granularities is available. For example, a subband RS and subband CSI-IM for CSI may be defined and transmitted together, or an RS and CSI-IM for CSI with different subband sizes may be defined and transmitted together.

Figure 10:
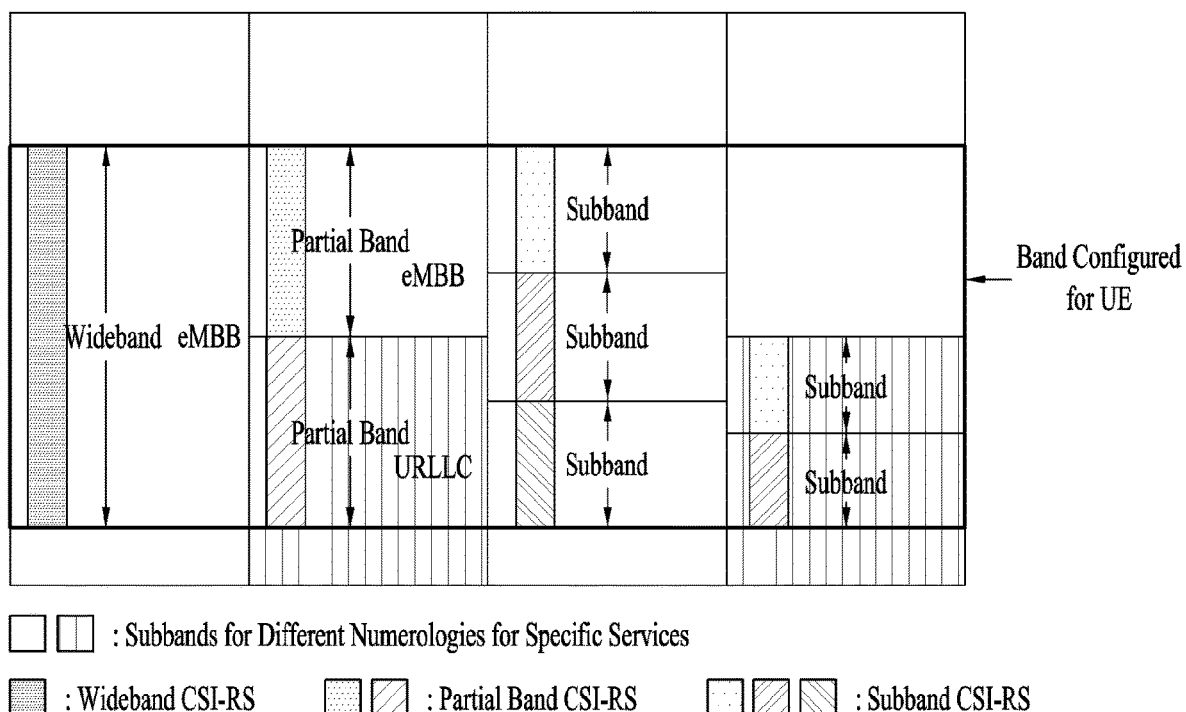
FIG. 10 illustrates CSI-RSs having different types of frequency granularities.

Additionally, in consideration of CSI reporting on the afore-defined wideband/partial band/subband basis, the frequency granularity of CSI reporting may also be configured independently from those of the CSI-RS and the CSI-IM. Further, a combination of different frequency granularities is also available. For example, subband CSI reporting based on a wideband CSI-RS and a partial band CSI-IM may be indicated. FIG. 10 illustrates CSI-RSs having different types of frequency granularities.

E. A CSI-RS resource set configuration may be defined across two subframes in the same manner as in D.

Figure 11:
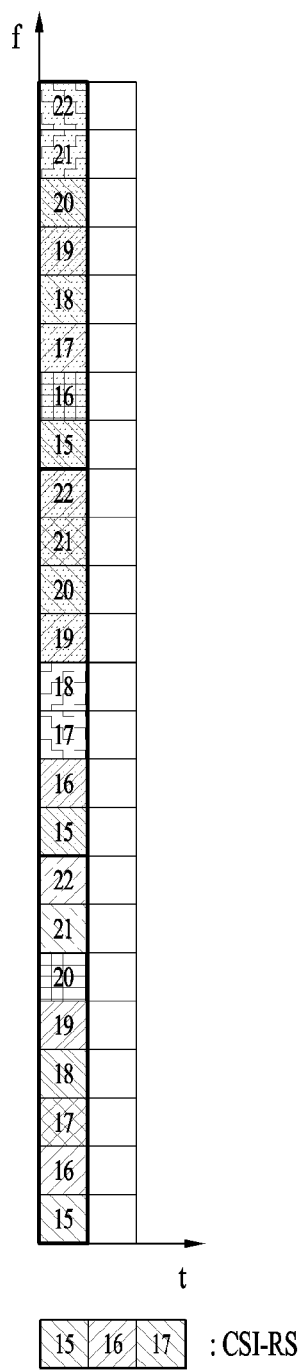
FIG. 11 illustrates a CSI-RS resource set configured across 2 resource blocks (RBs)

F. If the CSI-RS is defined in any other RB than an RB scheduled for the UE, the eNB may indicate to the UE the position of the RB in which the CSI-RS is to be defined. FIG. 11 illustrates CSI-RS resource sets configured across 2 RBs.

More specifically, CSI-RS resources may be defined in the following methods.

Alt 1. An LTE-like CSI-RS pattern defined in a resource unit (e.g., RB)

As in LTE, the positions of CSI-RS REs may be defined within a predetermined resource unit. In this case, when CSI-RSs are transmitted for a plurality of UEs or cells, CSI-RS patterns may be predesigned in consideration of the plurality of UEs or cells, which makes it relatively easy to ensure orthogonality between CSI-RSs for the plurality of UEs/eNBs. Further, since one of the predefined CSI-RS configurations is selected, configuration overhead is small.

Figure 12:
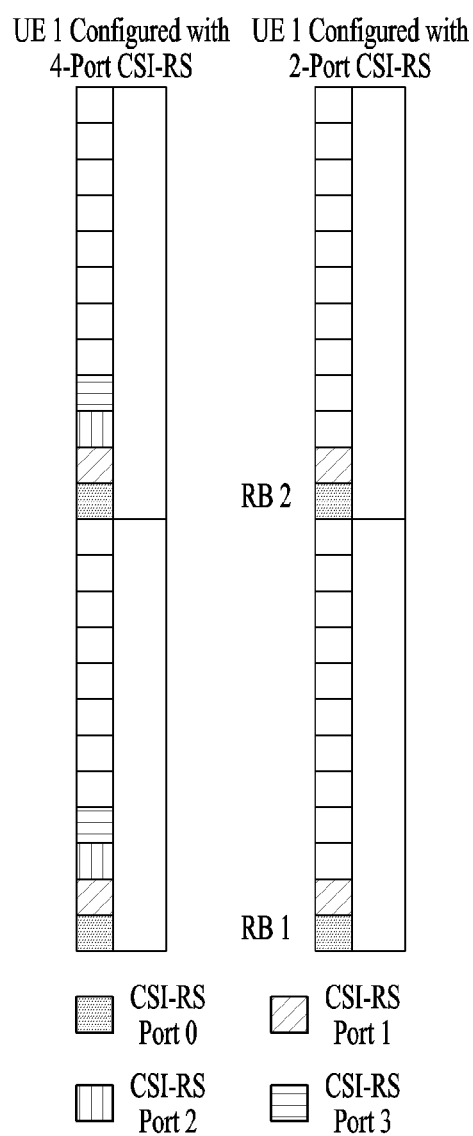
FIG. 12 illustrates a 2-port CSI-RS pattern, and a 4-port CSI-RS pattern.

FIG. 12 illustrates a 2-port CSI-RS pattern and a 4-port CSI-RS pattern.

A. Required Configuration Parameters: CSI-RS Pattern Index, CSI-RS Density, and Resource Unit Size i. Regarding the size of a resource unit, the resource unit size may be included in a corresponding CSI-RS configuration and transmitted to the UE, for the flexibility of the CSI-RS. Herein, a different CSI-RS pattern may be defined for each resource unit size.

ii. In Alt 1, a CSI-RS density is a representation of the spacing between CSI-RS resource units in units of the resource unit. That is, if a 16-port CSI-RS is configured in units of 2 RBs, and the CSI-RS density is set to ½, 2 RBs carrying the CSI-RS, 2 RBs without the CSI-RS, and 2 RBs carrying the CSI-RS are defined in this order.

Alt 2. CSI-RS Pattern Defined in 'Density' Parameters

Figure 13:
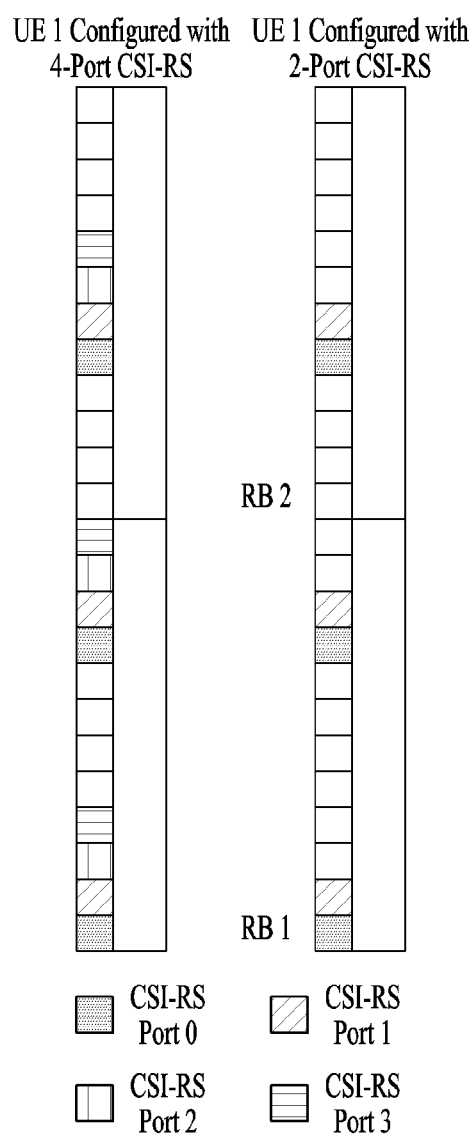
FIG. 13 illustrates CSI-RS patterns complying with base density configurations.

REs for each port are allocated with a basic minimum space according to a later-described 'base density'. If the base density is 4, and an additional density decrease is not set in FIG. 13, REs are allocated to each CSI-RS port, with a spacing of 4 REs.

In Alt 2, CSI-RS resources may be configured more freely because the CSI-RS resource configuration is not dependent on a CSI-RS pattern defined within an RB. Particularly, CSI-RS patterns for a plurality of UEs/eNBs may be generated, using a density parameter and an offset parameter.

A. Required Configuration Parameters: CSI-RS Density and CSI-RS Offset i. A CSI-RS density represents the spacing between CSI-RS port REs. If a CSI-RS density is set, this may be defined in the form of (base density*configured density). That is, the configured density may be defined to include an actual CSI-RS RE density along with a default density defined as the 'base density'.

ii. Definition of Base Density

1. The base density is a default spacing between CSI-RS REs, which may be predefined. The base density may be determined according to the maximum number of CSI-RS ports at the eNB, and additionally according to the number of frequency-orthogonal CSI-RS resources (for inter-cell CSI-RS allocation). For example, when a 16-port CSI-RS is to be transmitted, and frequency-orthogonal CSI-RS resources are not defined separately, the 'base density' is 16 REs. Therefore, the spacing between REs of the same CSI-RS port is 16 REs.

A. A maximum base density is the number of CSI-RS ports configured for the UE.

Figure 14:
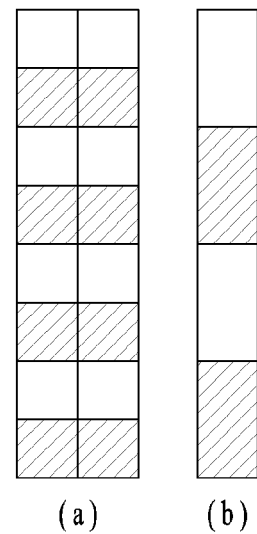
FIG. 14 illustrates CSI-RS patterns based on directions in which orthogonal code covers (OCCs) are applied.

B. If a later-described area for a different CSI-RS (e.g., a CSI-RS for beam management (BM)) is defined in a part of a frequency band, a base density should be determined taking into account the corresponding band.

iii. Herein, it is preferred in terms of CSI-RS measurement that CSI-RS REs (e.g., adjacent two REs) across which an orthogonal cover code (OCC) is applied are contiguous. Therefore, if the length of an OCC is 2, corresponding CSI-RSs may be configured to be contiguous along a time-axis direction as illustrated in (a) of FIG. 14, or along a frequency-axis direction as illustrated in (b) of FIG. 14.

iv. CSI-RS Frequency Offset

If there is a spacing between CSI-RS port REs according to a configured CSI-RS density, the position of the starting RE of a CSI-RS transmission may be defined. Herein, an offset unit may be a natural number multiple of an OCC length.

Figure 15:
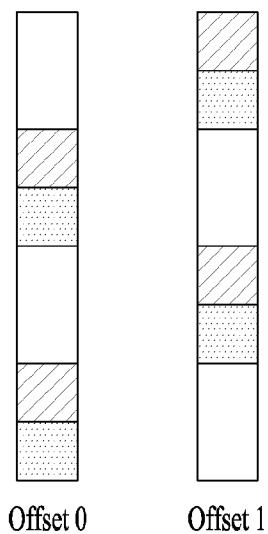
FIG. 15 illustrates offsets between CSI-RS resource elements (REs)

Alt 3. A CSI-RS density that varies with the maximum number of CSI-RS ports configured for the UE FIG. 15 illustrates a CSI-RS pattern for a 4-port CSI-RS, and a CSI-RS pattern for a 2-port CSI-RS.

A. This is similar to defining a base density to be equal to the number of CSI-RS ports configured for a UE in Alt 2.

B. In this case, if there are a smaller number of CSI-RS ports, a higher density per port is obtained, and thus higher measurement performance may be expected. However, if CSI-RS measurement performance does not increase along with a density increase (e.g., the CSI-RS measurement performance is saturated), or the CSI-RS measurement performance increases more than needed, the CSI-RS RE overhead increases.

C. Required Parameters: CSI-RS Density and CSI-RS Offset i. A CSI-RS pattern may be defined only with the number of CSI-RS ports.

When the afore-defined CSI-RS density is used as a method of allocating resources to transmit CSI-RSs with orthogonality between adjacent cells, CSI-RS pattern offsets may be defined between the cells by physical layer cell identifies (PCIDs), thus obviating the need for coordination.

Further, when a CSI-RS is designed, the design may be made in a manner that maintains the 'nested property'. The nested property implies that a CSI-RS pattern for a larger number of ports includes a CSI-RS pattern for a smaller number of ports. The resulting guarantee of CSI-RS resource scalability according to the number of ports facilitates CSI-RS resource alignment between different CSI-RSs, particularly different eNBs. This is preferable particularly for a zero power (ZP)-CSI-RS design. However, since maintaining the nested property for any number of ports, for example, 16 or more ports impairs design flexibility, CSI-RS resource units that maintain the nested property are preferably defined. For example, considering that CSI-RS patterns for more ports (e.g., 16, 20, 24, or 32 ports) may be generated by aggregation, n-port CSI-RS resources (e.g., n=4) may be defined as a CSI-RS base resource unit.

In another example, on the assumption of 12 subcarrier per RB in New RAT, 4 REs along the frequency-axis direction may be used as the size of a base resource unit for a CSI-RS. The base resource unit size may be useful for 3-cell coordination including interference measurement in units of 4 REs. In this case, if one symbol is used for a CSI-RS, the nested property may be maintained in CSI-RS patterns for up to 4 ports (i.e., 1, 2, or 4 ports), whereas the nested property may not be maintained in CSI-RS patterns for more ports.

Further, a different CSI-RS base resource for the nested property may be defined according to the number of symbols in which a CSI-RS is defined. For example, when the CSI-RS uses two symbols, a CSI-RS pattern may be designed, which uses an 8-port CSI-RS with 4 frequency resources by 2 time resources as the CSI-RS base resource. On the other hand, when the CSI-RS is defined in one symbol or a plurality of 1-symbol CSI-RSs are used for BM, a CSI-RS pattern may be designed, which uses a 4-port CSI-RS with 4 frequency resources by 1 time resource as the CSI-RS base resource.

In this case, a different density may be set for each port. Since all UEs do not support a large number of ports, an actually useful CSI-RS configuration is for a small number of ports, for example, 8 ports, and a CSI-RS configuration for a large number of ports is available to a relatively small number of UEs. Accordingly, a lower density may be set for CSI-RS ports more than a predetermined number of ports, for example, 15 ports than for a smaller number of CSI-RS ports, for overhead reduction. To this end, the eNB may transmit to the UE a density reduction configuration for a relatively large number of ports in a CSI-RS configuration.

Option 3. Number of TXUs at eNB

A. The eNB is not capable of transmitting more CSI-RS ports than the number of its TXUs. That is, as many CSI-RS ports as the maximum number of TXUs may not be multiplexed in one OFDM symbol. For example, if one RE is used per CSI-RS port, the number of TXUs at the eNB is the maximum height of one CSI-RS resource set, that is, the maximum number of CSI-RS REs per symbol within a CSI-RS resource set.

Figure 16:
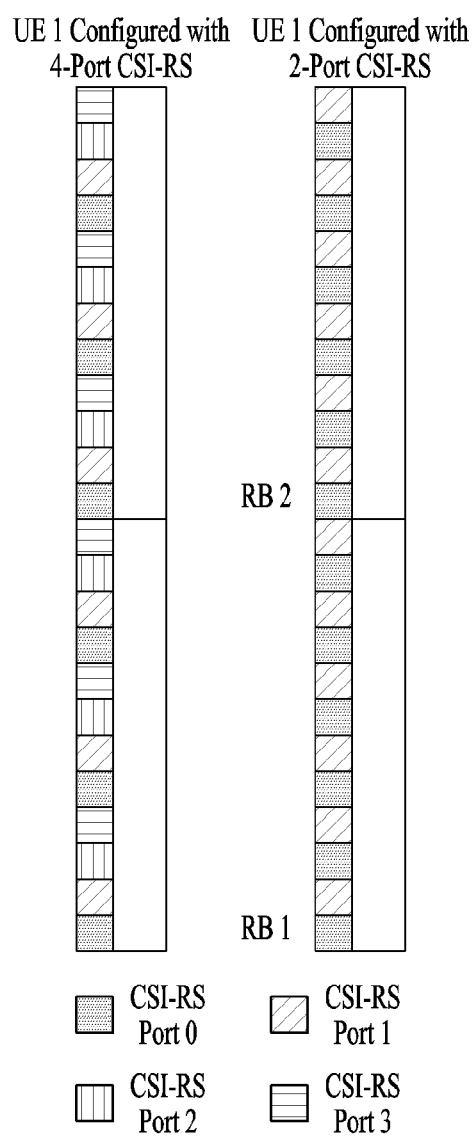
FIG. 16 illustrates CSI-RS patterns complying with base density configurations.

FIG. 16 illustrates a CSI-RS pattern for 4 TXUs and a CSI-RS pattern for 2 TXUs.

B. If TXUs are identical to RXUs at the eNB, the term TXU may be replaced with TXRU.

C. Strictly speaking, the number of analog beams transmitted per symbol may be limited by the number of TXUs of the eNB. Therefore, the maximum number of CSI-RS resources or CSI-RS port sets that may be multiplexed in FDM in one symbol may be determined by the number of TXUs of the eNB. In this case, the UE may explicitly or implicitly map the indexes of the corresponding CSI-RS resources (or CSI-RS port sets) to the indexes of (analog) beams. Therefore, the UE may feed back the index of a preferred CSI-RS resource (or CSI-RS port set) and related CSI measurement information together.

D. While the above concept has been described in the context of CSI-RS ports, the concept is also applicable to a case in which the eNB transmits a different analog beam per antenna port to the UE, for analog beam scanning/tracking (e.g., beam scanning RS, beam refinement RS, or the like). In this case, the maximum number of beam scanning RS ports or beam refinement RS ports transmitted per symbol may be limited by the number of TXUs at the eNB.

Option 4. Size of CSI-RS Indication Field in DCI

A. The maximum number of configurable CSI-RS resource sets may be determined according to the size of a CSI-RS indication field. Therefore, this may be used in selecting CSI-RS resource sets to be indicated actually by the CSI-RS indication of DCI from among CSI-RS resource sets configured according to the methods of Option 1 to Option 3.

FIG. 17 illustrates CSI-RS resource sets based on sizes (bit numbers) of a CSI-RS indication field.

Option 5. Length/Direction of OCC Applied to CSI-RS

For example, for a CSI-RS using an OCC of length 2 along the frequency-axis direction, a CSI-RS resource set as large as (an integer multiple of) 2 REs along the frequency-axis direction should be defined. The same method may be applied to the time axis.

A. If an OCC length may be expressed as integer a×b, such as an OCC length of 4, an OCC of length a and length b along the frequency-axis and time-axis directions, respectively may be used. For example, if an OCC length of 4 (=2×2) is used, length 2 may be used along the frequency-axis direction, and length 2 may be used along the time-axis direction. Therefore, CSI-RS resource sets may be configured as illustrated in (c) of FIG. 8. In this case, an OCC length for each direction should be signaled.

Option 6. CSI-RS Density

The eNB may indicate the frequency density of a CSI-RS to the UE. For example, if the CSI-RS is transmitted across a plurality of RBs, it may be indicated whether the CSI-RS of FIG. 7 exists in every RB or only in even-numbered RBs or with a lower frequency density.

For this purpose, the eNB may configure a plurality of CSI-RS configurations respectively for even-numbered RBs/odd-numbered RBs.

If a CSI-RS pattern is defined across m RBs, the CSI-RS pattern may be applied to RBs in which a CSI-RS transmission is defined with a reduced density, not to contiguous RBs. For example, a non-contiguous CSI-RS pattern may be applied every n RBs, when a 1/n density is set. That is, the CSI-RS pattern may be applied to m non-contiguous RBs apart from each other by n RBs. For example, if m=2 and n=2, the CSI-RS is transmitted in RBs 0, 3, 6, 9, . . . , and in a given pattern across RBs {0, 3}, and {6, 9}.

Instead of defining a density pattern by configuring a density such as 1/n, frequency resources (e.g., RBs or an RB group) to carry a CSI-RS may be defined in a manner such as a bitmap. The size of the bitmap may be equal to the number of frequency resources to carry the CSI-RS, corresponding to a maximum frequency band in which the CSI-RS may be transmitted, for example, a wideband or a partial band, and on/off of the CSI RS may be indicated for each frequency resource by a bit at a corresponding position.

If the size of the bitmap is smaller than the maximum frequency band in which the CSI-RS is transmittable, the CSI-RS pattern may be applied cyclically.

The above density configuration may be configured for a wideband or a partial band. More characteristically, the above density configuration may be different for each partial band.

Option 7. Number of CSI-RS Ports

A different number of CSI-RS ports may be configured for each CSI-RS set. In this case, an indication of the number of ports per CSI-RS set may be signaled.

Particularly, an indication of a port subset per CSI-RS set may be signaled.

Option 8. Number of Plural Subframes

A CSI-RS may be defined across a plurality of subframes. Particularly, like Class B of (enhanced) full dimension-multiple input multiple output ((e)FD-MIMO), a plurality of CSI-RS resources may be defined in a CSI process, and a CSI-RS to which different precoding is applied may be configured in each resource configuration, and transmitted in a different subframe. The CSI process and CSI resource configuration may be replaced with a CSI-RS configuration including the same information.

Herein, a transmission timing m for a CSI-RS may be indicated by an A-CSI-RS indication for a plurality of CSI-RSs, as follows.

A fixed timing m may be predefined.

The fixed timing m may be included in a CSI process or resource configuration.

A range of m may be predetermined. An m value within the range may be indicated to the UE by the A-CSI-RS indication.

The range of m may be included in the CSI process or resource configuration. An m value within the range may be indicated to the UE by the A-CSI-RS indication.

m may mean the following.

m is the spacing (or distance) between the A-CSI-RS indication and a first CSI-RS.

Figure 19:
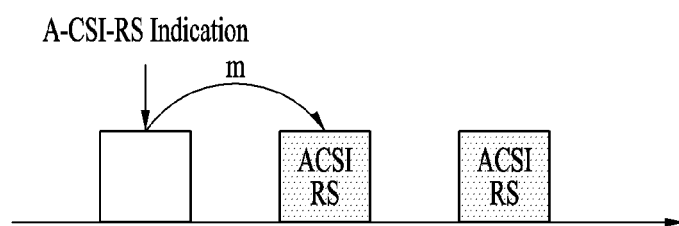
FIGS. 19 to 25 illustrate aperiodic CSI-RS indications and CSI-RS transmission timings based on the aperiodic CSI-RS indications.

FIG. 19 illustrates A-CSI-RS transmission timings m.

Figure 20:
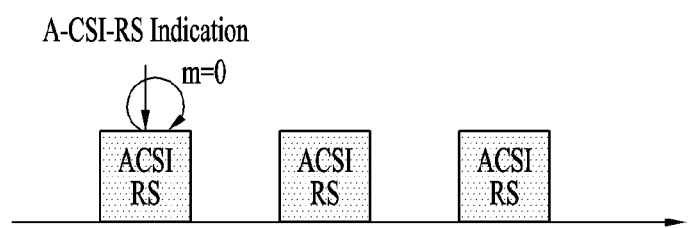

Particularly, the first A-CSI-RS and DCI including the corresponding indication may be transmitted in the same subframe. This case may be identical to a case in which the fixed value m is predefined as 0. FIG. 20 illustrates a case in which m=0.

m is the spacing (or distance) between the A-CSI-RS indication and a last CSI-RS.

Figure 21:
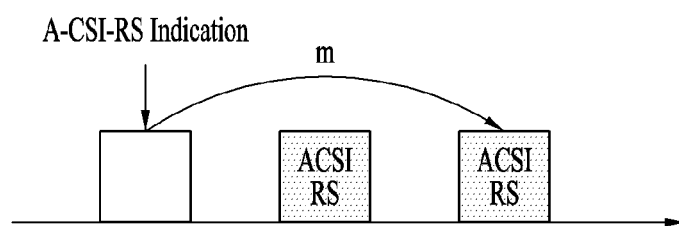
Figure 22:
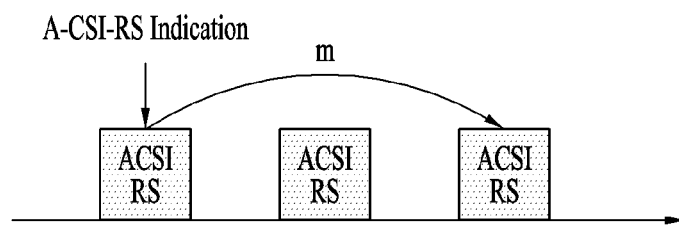

If an A-CSI-RS and the A-CSI-RS indication are not transmitted in the same subframe as in this case, an $i^{th}$ one of M A-CSI-RS timings in total may be an $(m/M*i)^{th}$ subframe where i=1, 2, 3, . . . , which is illustrated in FIG. 21.

Or if an A-CSI-RS and the A-CSI-RS indication are transmitted in the same subframe, an $i^{th}$ one of M A-CSI-RS timings in total may be an $((m/M-1)*i)^{th}$ subframe where i=1, 2, 3, . . . .

Or, it may be defined that m<0. In this case, transmission of an already transmitted A-CSI-RS may be indicated to the UE after the transmission of the A-CSI-RS.

The A-CSI-RS indication for the plurality of A-CSI-RSs may indicate a transmission timing interval p for the CSI-RSs as follows.

If m means the distance between the A-CSI-RS indication and the first CSI-RS, p=m without an additional configuration.

A fixed timing interval p may be pre-defined.

The fixed timing interval p may be included in a CSI process or resource configuration.

A range of p may be predetermined. A p value within the range may be indicated to the UE by the A-CSI-RS indication.

The range of p may be included in the CSI process or resource configuration. A p value within the range may be indicated to the UE by the A-CSI-RS indication.

Particularly, if CSI-RSs are transmitted successively, this case is identical to a case in which the fixed value p is predefined as 1.

p may mean the following.

The number of subframes between adjacent A-CSI-RSs.

Figure 23:
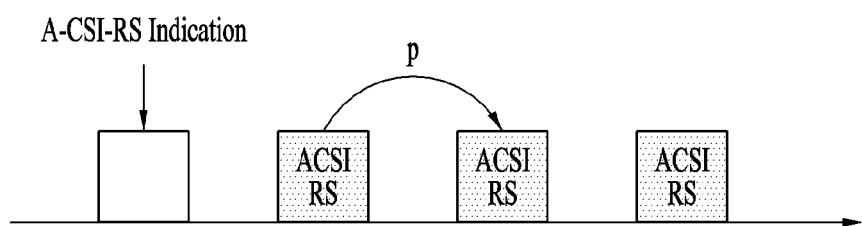

FIG. 23 illustrates p indicating the spacing between adjacent A-CSI-RSs.

The number of subframes between the first A-CSI-RS and the last A-CSI-RS.

Figure 24:
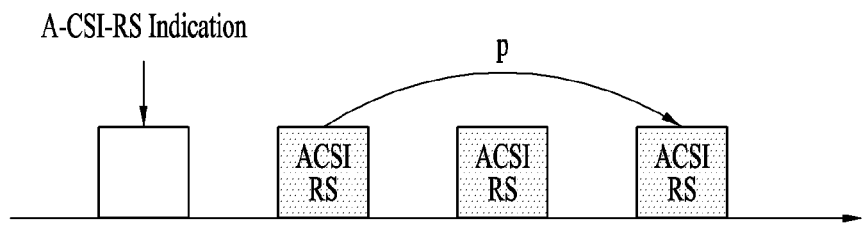

FIG. 24 illustrates p indicating the spacing between the first A-CSI-RS and the last A-CSI-RS.

In this case, an $i^{th}$ one of M A-CSI-RS timings in total may be a $((\text{first A-CSI-RS transmission timing})+p/(M-1)*(i-1))^{th}$ subframe where i=1, 2, . . . .

The number of subframes between the A-CSI-RS indication and the last CSI-RS.

Figure 25:
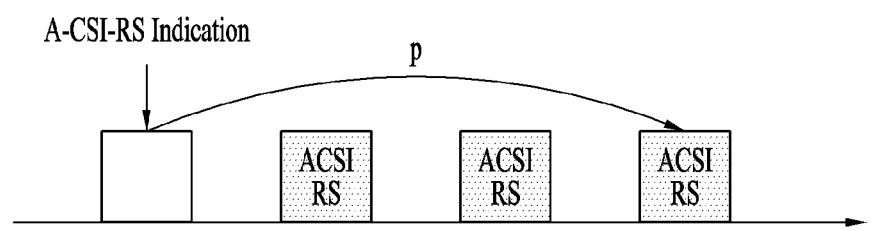

FIG. 25 illustrates p indicating the spacing between the A-CSI-RS indication and the last CSI-RS.

In this case, all corresponding CSI-RSs are measured, and then CSI is calculated and reported for the measurements. For example, in the case of Class B of (e)FD-MIMO, after the last CSI-RS is measured, a CSI-RS resource indicator (CRI) may be calculated, derived, and reported. Therefore, the CSI for the corresponding CSI-RS(s) is reported after a subframe carrying a last CSI-RS symbol.

As such, when A-CSI-RSs for a plurality of CSI-RSs are transmitted, and the eNB transmits an indication of a corresponding A-CSI-RS RS to the UE, the eNB may indicate an aperiodic CSI request for the corresponding A-CSI-RS by DCI. Herein, the eNB may indicate a CSI feedback timing k at which the UE is to transmit aperiodic CSI in the following methods.

A fixed timing k may be predefined.

The fixed timing k may be included in a CSI process or resource configuration.

A range of k may be predetermined. A k value within the range may be indicated to the UE by the aperiodic CSI request.

Figure 26:
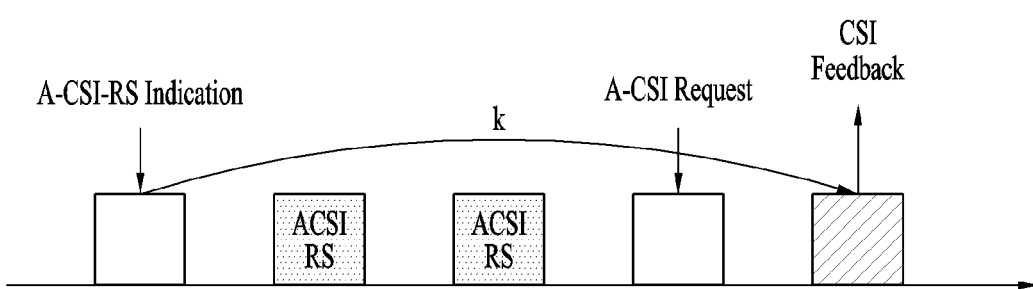
FIGS. 26 to 29 illustrate aperiodic CSI-RS indications, CSI-RS transmissions based on the aperiodic CSI-RS indications, aperiodic CSI requests, and CSI feedback timings based on the aperiodic CSI requests.
Figure 27:
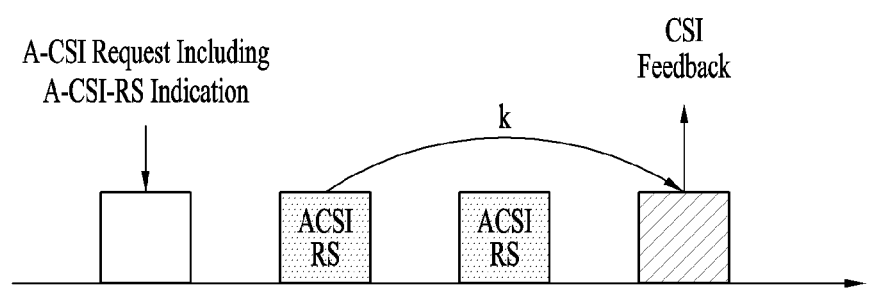
Figure 28:
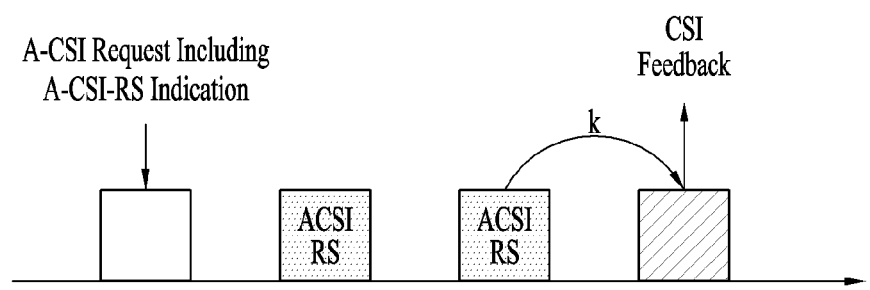
Figure 29:
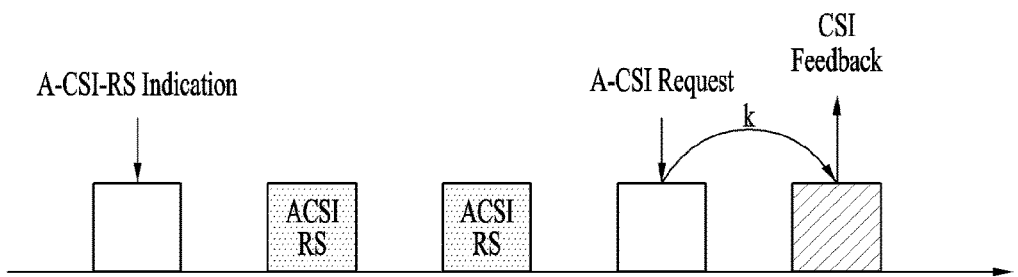

The range of k may be included in the CSI process or resource configuration. A k value within the range may be indicated to the UE by the aperiodic CSI request.

k may mean the following.

k is the spacing (or distance) between the A-CSI-RS indication and a CSI feedback time, which is illustrated in FIG. 26.

k is the spacing (or distance) between the first A-CSI-RS and the CSI feedback time, which is illustrated in FIG. 27.

k is the spacing (or distance) between the last A-CSI-RS and the CSI feedback time, which is illustrated in FIG. 28.

k is the spacing (or distance) between the aperiodic CSI request and the CSI feedback time, which is illustrated in FIG. 29.

Option 9. Wideband/Partial Band Resource Separation

RS resources available for defining a wideband CSI-RS and RS resources available for defining a CSI-RS for a specific partial band (narrower than a wideband) may be defined separately without overlap. In this case, each CSI-RS should be configured within the resources available for the CSI-RS.

While CSI-RS REs have been described and illustrated above as contiguous, non-contiguous REs satisfying the constraint may be defined for a CSI-RS, in real implementation.

Figure 30:
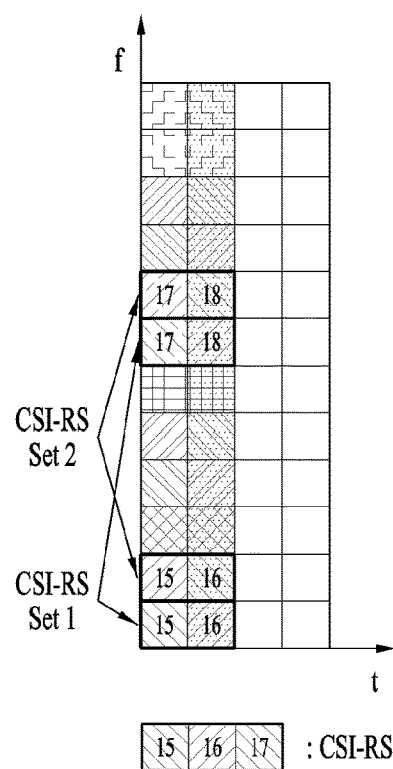
FIGS. 30 and 31 illustrate configurations of CSI-RS resource sets.

FIG. 30 illustrates individual CSI-RS (resource) sets each defined with non-contiguous REs.

The above descriptions may be considered alone or in combination so that a set of CSI-RS resource sets may be defined. For this purpose, the eNB may indicate one or more of the foregoing factors (the number of CSI-RS symbols, the number of CSI-RS REs per symbol per RB, the number of RBs in which a CSI-RS is defined, the number RXUs at an eNB, the size of a CSI-RS indication field in DCI, and the length/direction of an OCC) to the UE by signaling such as RRC signaling or the like, while the remaining factors may be predefined. Particularly, a factor that may be common within a cell (e.g., the number of TXUs at the eNB) may be broadcast by system information such as an SIB, to thereby further decrease signaling overhead.

The UE may use predetermined initial values of the above factors (and a CSI-RS resource set configuration corresponding to the initial values of the factors) until before receiving additional signaling from the eNB. For example, the UE may operate on the assumption of the initial values of one or more of the factors (e.g., one CSI-RS symbol, 12 CSI-RS REs per symbol per RB, a CSI-RS defined in one RB, 2TXUs of the eNB, a 2-bit CSI-RS indication field in DCI, and OCC off) (and a CSI-RS resource set configuration corresponding to the initial values) until receiving additional signaling from the eNB.

Or the above signaling may be implicitly transmitted by other signaling. For example, when the eNB indicates or the UE may derive the number of BRS (or radio resource management-reference signal (RRM-RS)) ports to be used in New Rat, the UE may (temporarily) assume the number of BRS ports to be the number of TXUs of the eNB.

The above method may be used in specifying only a CSI-RS resource set to be actually used, among predefined CSI-RS resource sets. For example, if a predefined CSI-RS resource set configuration includes configurations for (a) and (b) of FIG. 16, that is, configurations corresponding to different numbers of TXUs, and the UE receives signaling indicating that TXU=2 from the eNB, the UE may consider that the configuration corresponding to (a) of FIG. 16, that is, a CSI-RS resource set requiring TXU=4 is not used.

Figure 31:
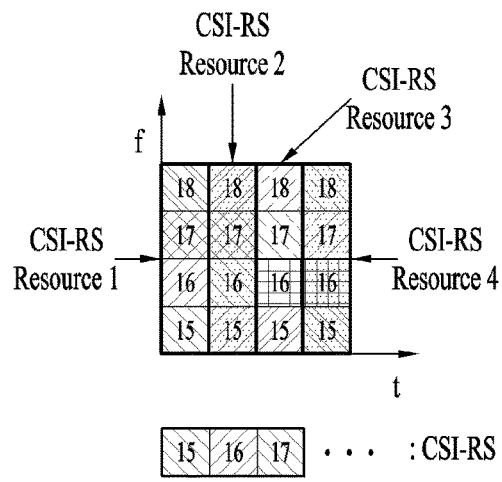

Further, a CSI-RS resource set to be actually used may be limited by a time requirement of CSI reporting. For example, if a fast CSI feedback such as a feedback within a TTI is configured for the UE in a situation such as a self-contained structure, the UE may be limited to use only a CSI-RS resource set satisfying a predetermined condition in a TTI among CSI-RS sets. For example, if CSI-RS resources 1, 2, 3, and 4 are defined as illustrated in FIG. 31, and a CSI-RS satisfying a condition for a report timing within a TTI is '4 ports, up to the second symbol', the UE may consider that only CSI-RS resource set 1={CSI-RS resources 1 and 2} is available, and CSI-RS resource set 2={CSI-RS resources 3 and 4} is not available, among the following CSI-RS resources. In another example, if an 8-port CSI-RS resource set is defined, the set is not used either. In this case, the eNB may transmit only signaling corresponding to CSI-RS resource set 1 to the UE, and the signaling may be configured as 1-bit on/off in the illustrated case of FIG. 30. In the other words, the eNB transmits a 'fast CSI request' to the UE, and the UE calculates and transmits CSI for CSI-RS resource set 1 within a given time requirement. Or the signaling is still used, and the UE may not calculate/report CSI for a CSI-RS resource set that does not satisfy the condition, for example, CSI-RS resource set 2 in FIG. 30.

To perform the operation, the eNB may regulate that the UE should configure at least one CSI-RS resource set satisfying the above condition.

In the presence of a plurality of candidates, a CSI-RS resource set to be used may be predefined in order to reduce signaling overhead. For example, the UE may use a CSI-RS resource set having a smaller CSI-RS resource set ID among the plurality of candidates, for CSI reporting in the above situation.

Or, the eNB may configure the UE with each CSI-RS resource set by a bitmap through signaling such as RRC signaling or the like. In this case, when a CSI-RS resource set is selected by the bitmap, one or more of the foregoing factors (the number of CSI-RS symbols, the number of CSI-RS REs per symbol per RB, the number of RBs in which a CSI-RS is defined, the number of TXUs at the eNB, the size of a CSI-RS indication field in DCI, and the length/direction of OCC) may be applied as constraints. In this case, when the UE receives a wrong CSI-RS resource set configuration, the UE may consider that a corresponding CSI-RS resource set is not used. For example, if there are configurations corresponding to (a) and (b) of FIG. 16, and the UE receives signaling indicating TXU=2 from the eNB, the UE may not report CSI for the configuration corresponding to (a) of FIG. 16, that is, a CSI-RS resource set requiring TXU=4.

While CSI-RS resource sets have been described above in the context of NZP CSI-RS, the same may be applied to NZP CSI-IM. That is, the UE may measure interference in a CSI-RS resource set designated as CSI-IM (i.e., a CSI-IM resource set), and use the interference measurement in CSI calculation. When indicating a CSI-RS resource set to the UE by DCI, the eNB may indicate whether the corresponding resources are for an NZP CSI-RS or an NZP CSI-IM, or a CSI-RS resource set configuration itself may define a specific CSI-RS resource set as NZP CSI-IM resources.

While the above description is given in the context of CSI-RS in the specification, 'CSI-RS' may be replaced with another type of RS available for CSI calculation in the description.

Particularly, when any other type of RS (e.g., BRS, beam refinement reference signal (BRRS), DMRS, or beam management RS (BMRS)) than the CSI-RS is available for CSI calculation, the RS type (e.g., BRS, BRRS, DMRS, or BMRS) may be indicated by an 'RS type indicator' in an RS resource indication. For this purpose, a specific state of the RS resource indication may indicate an RS type other than the CSI-RS, and upon receipt of the RS resource indication, the UE may use the RS type for which the RS resource indication is different, for example, BRS in CSI calculation. In this case, a feedback type (e.g., CQI only), a maximum number of ports, a maximum rank, and so on may be limited according to the RS type.

The RS type indicator may include a parameter similar to the afore-described CSI-RS configuration. For example, the RS type including BRS may be signaled, inclusive of the number of BRS ports and BRS resources (e.g., the number of symbols carrying the BRS).

Or this 'RS type indicator' may be transmitted to the UE in a separate DCI field. For example, a 1-bit indicator may indicate to the UE whether the CSI-RS or the BRS is to be used in CSI calculation/reporting.

Further, while the description has been given in the context of a self-contained structure in which a CSI-RS resource exists in the first symbol of an RB, for the convenience, the description does not limit the position of a CSI-RS resource to the first symbol of an RB (or TTI). That is, it is obvious that the CSI-RS resource configuration methods described in the specification are applicable to any RS for CSI to be used in New RAT, not limited to the self-contained environment.

The foregoing CSI-RS-related configuration may be different for different numerologies. Therefore, when a UE supports a plurality of numerologies, a CSI-RS configuration may be given separately for use in each case, and the UE may measure channel/interference, using a CSI-RS configuration applied to the numerology of a band in which the UE is to transmit actual data. This operation may be implemented by giving a different CSI-RS configuration for each partial band in which the same numerology is used. For example, different CSI-RS patterns may be configured for different numerologies.

In the specification, the term, CSI-RS pattern is used in the same meaning as CSI-RS resource set, and the two terms are interchangeably used with each other.

In New RAT, BM is considered for the CSI-RS in order to select and use a plurality of transmission/reception (analog) beam pairs.

Figure 32:
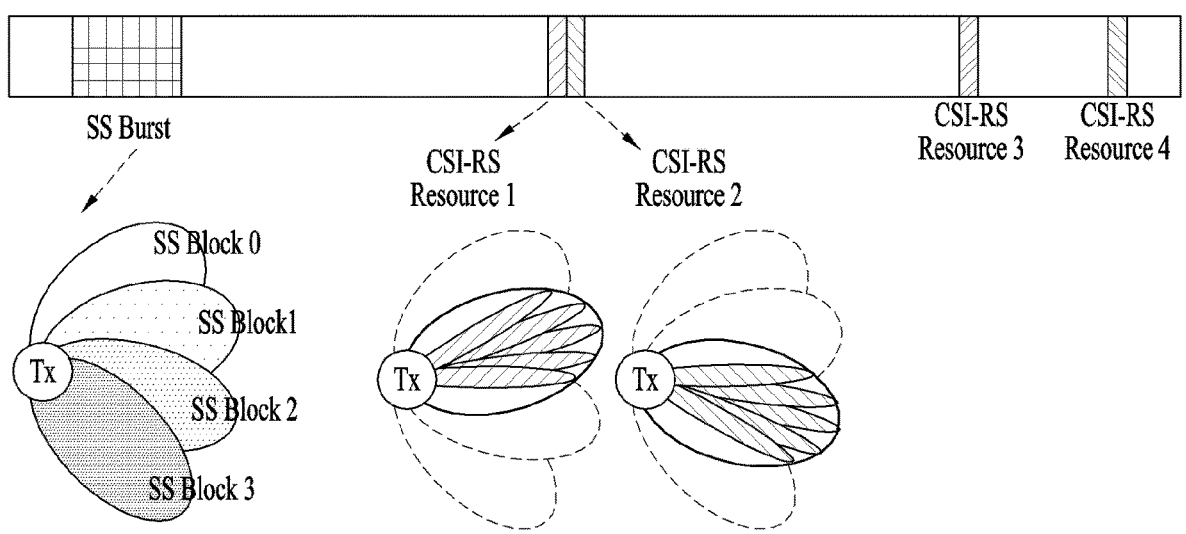
FIG. 32 illustrates a beam management (BM) procedure.

FIG. 32 illustrates a simple example of a BM procedure.

The eNB transmits an SS burst to the UE, with a different analog beam applied to each SS block. A corresponding analog beam is more coarse and wider than a beam to be used later for a CSI-RS. The UE measures power such as reference signal received power (RSRP) in a plurality of SS blocks, and reports an SS block having the best quality among the received SS blocks, that is, the best coarse beam to the eNB.

The eNB then configures a CSI-RS resource for the UE, and transmits a CSI-RS on different analog beams in different time units (one or more OFDM symbols) in the CSI-RS resource. As illustrated, a corresponding beam is transmitted within a coarse beam corresponding to a specific SS block that the eNB has previously transmitted. For this purpose, the eNB may indicate to the UE that the corresponding CSI-RS (port) is quasi-co-located with the specific SS block. The UE measures an RSRP in each time unit, and reports the index of a CSI-RS resource having the best RSRP to the eNB.

Subsequently, the eNB indicates an analog beam to be used for data transmission to the UE by QCL signaling with the CSI-RS resource.

A design is intended to integrate a CSI-RS configuration for the above BM with a CSI-RS configuration for CSI measurement and reporting. Since periodic transmission of a CSI-RS for BM in a wideband is considered, some property may be limited to reduce overhead or avoid collision with another RS.

Option 1. Time Resource

A. Different time resources may be configured for a CSI-RS for BM and a CSI-RS for CSI.

i. Different starting positions may be set for the CSI-RS for BM and the CSI-RS for CSI within a subframe or its equivalent time unit.

Figure 33:
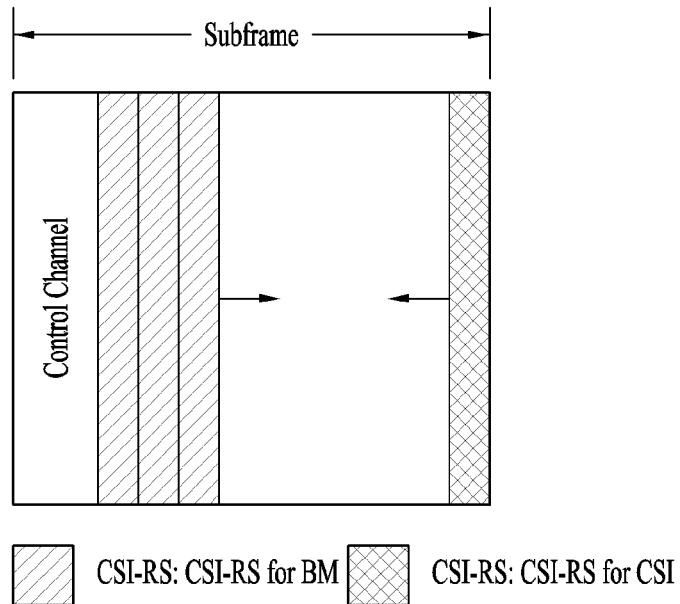
FIG. 33 illustrates allocation of a CSI-RS for BM and a CSI-RS for channel state information (CSI) in time resources.

1. For example, as illustrated in FIG. 33, it may be defined that the CSI-RS for BM states from the first symbol and the CSI-RS for CSI starts from the last symbol in an RB.

ii. Only the CSI-RS for BM is allowed to be transmitted in a plurality of symbols.

iii. If a different CSI-RS resource is defined for each (analog beam) in the CSI-RS for BM, the position of a CSI-RS symbol in a data region may be allowed only for the CSI-RS for BM. However, this case is allowed only when the CSI-RS symbol is adjacent to another CSI-RS resource symbol.

Option 2. Frequency Resource

Figure 34:
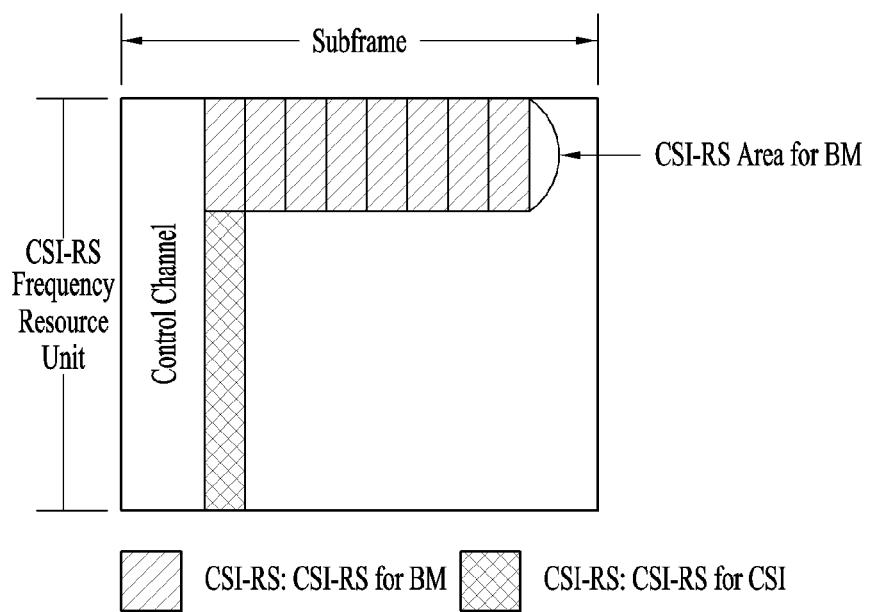
FIG. 34 illustrates allocation of a CSI-RS for BM and a CSI-RS for CSI in frequency resources.

A. An RE area in which the CSI-RS for BM is transmitted may be defined in a predetermined CSI-RS frequency resource unit (e.g., RB). The RE area may be formed as illustrated in FIG. 34 in which the CSI-RS for BM is transmitted in a plurality of symbols using some frequency band of the CSI-RS for CSI which uses a small number of resources (e.g., 1 symbol).

i. Because the CSI-RS for BM uses fewer ports (e.g., 2 ports) than the CSI-RS for CSI, the CSI-RS for BM may occupy a smaller frequency area than the CSI-RS for CSI.

ii. Since the CSI-RS frequency resource unit is repeated along the frequency axis, better performance may be expected in terms of BM.

Option 3. Maximum Number of Ports

For overhead reduction, the maximum number of ports may be limited for the CSI-RS for BM. The maximum number of ports may be limited to 1 simply for power measurement, or 2 in consideration of power measurement for each slant of a cross-pole antenna.

Option 4. Maximum Density

For the above reason, the maximum density may be limited for the CSI-RS for BM. Particularly, since fast fading of a channel may not be considered in the CSI-RS for BM, high channel measurement performance may not be required. As described before, regarding the density, both of a frequency-axis density and a time-axis density (e.g., a period) may be considered.

Option 5. OCC Length/Direction

The CSI-RS for BM defined in contiguous symbols may be transmitted by applying different analog beams to adjacent symbols. As such, it is not preferable to apply an OCC between REs to which different analog beams are applied. To avoid that, it may be limited that an OCC is not used or only a frequency-directional OCC is used, for the CSI-RS for BM.

Option 6. Base CSI-RS Resource for Nested Property

For the nested property, different types of base CSI-RS resources may be defined for the CSI-RS for BM and the CSI-RS for CSI. For example, a CSI-RS pattern may be designed, which uses 8 ports with 4 frequency resources by 2 time resources as a base CSI-RS resource for the nested property, for the CSI-RS for CSI, and 2 ports with 2 frequency resources by 1 time resource as a base CSI-RS resource for the nested property, for the CSI-RS for BM.

While the above characteristics may be configured by a CSI-RS configuration under the same condition for the CSI-RS for CSI, it may be directly indicated whether a corresponding CSI-RS configuration is for the CSI-RS for BM or the CSI-RS for CSI, by means of a separate CSI-RS type indication. In this case, the above configuration may be interpreted as a different meaning by the UE according to the CSI-RS type indication. For example, in the case where the CSI-RS type indication indicates the CSI-RS for CSI, and OCC configurations '00' and '01' mean 'OCC off' and 'time OCC, length 2', respectively, if the CSI-RS type indication indicates the CSI-RS for BM, the OCC configurations '00' and '01' mean 'OCC off' and 'frequency OCC, length 2', respectively.

In real technology implementation, the above descriptions may be used alone or in combination. Further, a CSI-RS configuration including the afore-described CSI-RS options may also be transmitted to the UE by L1/L2 signaling (e.g., a MAC CE) other than legacy L3 signaling (e.g., RRC signaling).

While the above description has been given in the context of the 3GPP LTE system, for the convenience of description, the range of systems to which the proposed methods are applied may be extended to other systems (e.g., UTRA) than the 3GPP LTE system, particularly 5G and its candidate technologies.

Figure 35:
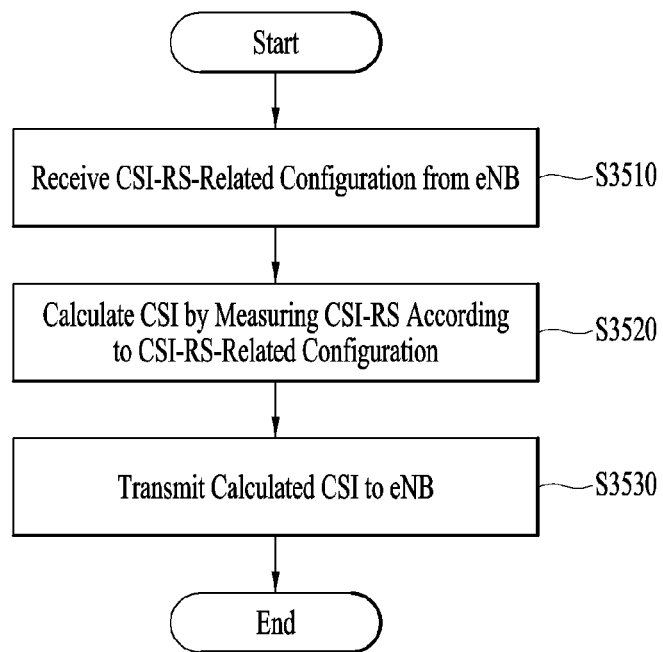
FIG. 35 illustrates an operation of a user equipment (UE) according to an embodiment of the present disclosure.

FIG. 35 illustrates an operation according to an embodiment of the present disclosure.

FIG. 35 relates to a method of reporting a channel state based on a CSI-RS in a wireless communication system. A UE may receive a CSI-RS-related configuration from an eNB (S3510). The UE may calculate CSI by measuring a CSI-RS according to the CSI-RS-related configuration (S3520). Subsequently, the UE may transmit the calculated CSI to the eNB (S3530). The CSI-RS-related configuration may include a CSI-RS configuration for CSI or a CSI-RS configuration for BM.

Further, the CSI-RS-related configuration may include information about time resources related to the CSI-RS for BM, distinguished from resources related to the CSI-RS for CSI on the time axis. The information about time resources related to the CSI-RS for BM may be configured so that the time resources have a different starting position from that of the resources related to the CSI-RS for CSI.

Further, the CSI-RS-related configuration may include information about a maximum number of antenna ports for the CSI-RS for BM.

Further, the CSI-RS-related configuration may include information about a maximum density of the CSI-RS for BM.

Further, the CSI-RS-related configuration may indicate one of a CSI-RS configuration for CSI or a CSI-RS configuration for BM, and the received CSI-RS-related configuration may be interpreted according to the indicated CSI-RS configuration.

While the embodiments of the present disclosure have been described in brief with reference to FIG. 35, the embodiment related to FIG. 35 may include at least a part of the foregoing embodiment(s), alternatively or additionally.

Figure 36:
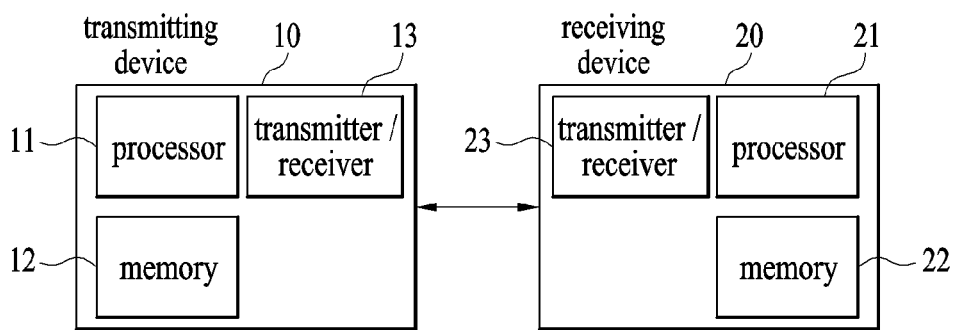
FIG. 36 is a block diagram of apparatuses for implementing embodiment(s) of the present disclosure.

FIG. 36 is a block diagram illustrating components of a transmitting device 10 and a receiving device 20 configured to implement exemplary embodiments of the present disclosure. The transmitting device 10 and the receiving device 20 respectively include transmitters/receivers 13 and 23 for transmitting and receiving wireless signals carrying information, data, signals, and/or messages, memories 12 and 22 for storing information related to communication in a wireless communication system, and processors 11 and 21 connected operatively to the transmitters/receivers 13 and 23 and the memories 12 and 22 and configured to control the memories 12 and 22 and/or the transmitters/receivers 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 20 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In the embodiments of the present disclosure, a terminal or UE operates as the transmitting device 10 on UL, and as the receiving device 20 on DL. In the embodiments of the present disclosure, a BS or eNB operates as the receiving device 20 on UL, and as the transmitting device 10 on DL.

The transmitting device and/or the receiving device may be configured as a combination of one or more embodiments of the present disclosure.

It will be apparent to those skilled in the art that various modifications and variations can be made in the present disclosure without departing from the scope of the inventions. Thus, it is intended that the present disclosure covers the modifications and variations of this disclosure provided they come within the scope of the appended claims and their equivalents.

INDUSTRIAL APPLICABILITY

The present disclosure is applicable to wireless communication devices such as a terminal, a relay, and a base station.

The invention claimed is:

1. A method for a user equipment (UE) to perform various types of operations based on a channel status information-reference signal (CSI-RS) in a wireless communication system, the method comprising:
   receiving a CSI-RS configuration from a network, wherein the CSI-RS configuration informs the UE about one of a first type operation calculating a CSI based on a measurement of the CSI-RS, and a second type operation for beam management (BM) based on multiple beams repeatedly received through different OFDM (Orthogonal Frequency Divisional Multiplexing) symbols;
   reporting the CSI to the network based on the first type operation in response to the CSI-RS configuration informing the UE of the first type operation; and
   performing beam management based on the second type operation for BM using the multiple beams repeatedly received through different OFDM symbols in response to the CSI-RS configuration informing the UE of the second type operation.

2. The method of claim 1, wherein the CSI-RS configuration informing the UE of the second type operation further informs the UE that the CSI-RS is repeatedly received.

3. The method of claim 2, wherein the CSI-RS configuration informing the UE of the second type operation further informs the UE of wideband frequency-granularity.

4. The method of claim 1, wherein the number of antenna ports of the CSI-RS configuration informing the UE of the second type operation is limited to 1 or 2.

5. The method of claim 1, wherein the CSI-RS configuration informing the UE of the first type operation and the CSI-RS configuration informing the UE of the second type operation are received together within the CSI-RS configuration.

6. The method of claim 1,
wherein the CSI-RS configuration informing the UE of the second type operation includes information on a number of antenna ports and a density of the CSI-RS, and
wherein the information on the density of the CSI-RS is associated with a number of symbols for the CSI-RS.

7. A user equipment (UE) configured to perform various types of operations based on a channel status information-reference signal (CSI-RS) in a wireless communication system, the UE comprising:
a transmitter and a receiver;
a processor, operatively coupled with the transmitter and the receiver, and configured to:
control the receiver to receive a CSI-RS configuration from a network, wherein the CSI-RS configuration informs the processor about one of a first type operation calculating a CSI based on a measurement of the CSI-RS, and a second type operation for beam management (BM) based on multiple beams repeatedly received through different OFDM (Orthogonal Frequency Divisional Multiplexing) symbols;
control the transmitter to transmit the CSI to the network based on the first type operation in response to the CSI-RS configuration informing the UE of the first type operation; and
perform beam management based on the second type operation for BM using the multiple beams repeatedly received through different OFDM symbols in response to the CSI-RS configuration informing the UE of the second type operation; and
a memory operatively coupled with the processor and configured to store the CSI-RS configuration.

8. The UE of claim 7, wherein the processor is informed that the CSI-RS is repeatedly received by the CSI-RS configuration informing the UE of the second type operation.

9. The UE of claim 8, wherein the processor is informed of wideband frequency granularity by the CSI-RS configuration informing the UE of the second type operation.

10. The UE of claim 7, wherein the number of antenna ports of the CSI-RS configuration informing the UE of the second type operation is limited to 1 or 2.

11. The UE of claim 7, wherein the CSI-RS configuration informing the UE of the first type operation and the CSI-RS configuration informing the UE of the second type operation are received together within the CSI-RS configuration.

12. The UE of claim 7,
wherein the CSI-RS configuration informing the UE of the second type operation includes information on a number of antenna ports and a density of the CSI-RS, and
wherein the information on the density of the CSI-RS is associated with a number of symbols for the CSI-RS.

13. A method for a network apparatus transmitting a channel status information-reference signal (CSI-RS) to a user equipment (UE) in a wireless communication system, the method comprising:
transmitting a CSI-RS configuration to the UE, wherein the CSI-RS configuration informs the UE about one of a first type operation calculating a CSI based on a measurement of the CSI-RS, and a second type operation for beam management (BM) based on multiple beams repeatedly transmitted through different OFDM (Orthogonal Frequency Divisional Multiplexing) symbols;
receiving the CSI from the UE based on the first type operation in response to the CSI-RS configuration informing the UE of the first type operation; and
managing one or more beams based on the second type operation of the UE for BM using the multiple beams repeatedly transmitted through different OFDM symbols in response to the CSI-RS configuration informing the UE of the second type operation.

14. The method of claim 13,
wherein the CSI-RS configuration informing the UE of the second type operation includes information on a number of antenna ports and a density of the CSI-RS, and
wherein the information on the density of the CSI-RS is associated with a number of symbols for the CSI-RS.

15. A network apparatus transmitting a channel status information-reference signal (CSI-RS) to a user equipment (UE) in a wireless communication system, the apparatus comprising:
a transmitter and a receiver;
a processor, operatively coupled with the transmitter and the receiver, and configured to:
control the transmitter to transmit a CSI-RS configuration to the UE, wherein the CSI-RS configuration informs the UE about one of a first type operation calculating a CSI based on a measurement of the CSI-RS, and a second type operation for beam management (BM) based on multiple beams repeatedly transmitted through different OFDM (Orthogonal Frequency Divisional Multiplexing) symbols;
control the receiver to receive the CSI from the UE based on the first type operation in response to the CSI-RS configuration informing the UE of the first type operation; and
manage one or more beams based on the second type operation of the UE for BM using the multiple beams repeatedly transmitted through different OFDM symbols in response to the CSI-RS configuration informing the UE of the second type operation; and
a memory operatively coupled with the processor and configured to store the CSI-RS configuration.

16. The network apparatus of claim 15,
wherein the CSI-RS configuration informing the UE of the second type operation includes information on a number of antenna ports and a density of the CSI-RS, and
wherein the information on the density of the CSI-RS is associated with a number of symbols for the CSI-RS.

* * * * *